US009971822B1

(12) United States Patent
Deardeuff et al.

(10) Patent No.: US 9,971,822 B1
(45) Date of Patent: May 15, 2018

(54) REPLICATED STATE MANAGEMENT USING JOURNAL-BASED REGISTERS

(71) Applicant: Amazon Technologies, Inc., Seattle, WA (US)

(72) Inventors: Michael Benjamin Deardeuff, Seattle, WA (US); Timothy Daniel Cole, Seattle, WA (US); Aaron Gifford Freshwater, Seattle, WA (US); Allan Henry Vermeulen, Corvallis, OR (US)

(73) Assignee: Amazon Technologies, Inc., Seattle, WA (US)

( * ) Notice: Subject to any disclaimer, the term of this patent is extended or adjusted under 35 U.S.C. 154(b) by 318 days.

(21) Appl. No.: 14/983,237

(22) Filed: Dec. 29, 2015

(51) Int. Cl.
*G06F 17/30* (2006.01)
*G06F 9/46* (2006.01)

(52) U.S. Cl.
CPC ........ *G06F 17/30575* (2013.01); *G06F 9/466* (2013.01); *G06F 9/467* (2013.01); *G06F 17/30191* (2013.01)

(58) Field of Classification Search
CPC ........ G06F 17/30575; G06F 17/30578; G06F 17/30088; G06F 17/30191; G06F 9/466; G06F 9/467
See application file for complete search history.

(56) References Cited

U.S. PATENT DOCUMENTS

| 8,364,633 | B2 |   | 1/2013  | Aahlad |            |
|-----------|----|---|---------|--------|------------|
| 9,264,516 | B2 | * | 2/2016  | Aahlad | H04L 67/10 |
| 9,332,069 | B2 | * | 5/2016  | Aahlad | H04L 67/1048 |
| 9,467,510 | B2 | * | 10/2016 | Aahlad | H04L 67/10 |
| 9,799,081 | B1 | * | 10/2017 | Lewis  | G06Q 50/01 |
| 2006/0155729 | A1 | * | 7/2006 | Aahlad | G06F 9/52 |
| 2013/0166574 | A1 | * | 6/2013 | Kang   | G06Q 30/02 707/749 |
| 2014/0188971 | A1 | * | 7/2014 | Aahlad | H04L 67/10 709/201 |
| 2014/0189004 | A1 | * | 7/2014 | Aahlad | H04L 67/1048 709/204 |

(Continued)

FOREIGN PATENT DOCUMENTS

CN           103995868          8/2014

OTHER PUBLICATIONS

"Pushdown automaton", Wikipedia, Retrieved from URL: https://en.wikipedia.org/wiki/Pushdown_automaton on Dec. 14, 2015, pp. 1-10.

(Continued)

*Primary Examiner* — William Spieler
(74) *Attorney, Agent, or Firm* — Robert C. Kowert; Meyertons, Hood, Kivlin, Kowert & Goetzel, P.C.

(57) ABSTRACT

A transaction request is received at a journal-based state management system. The transaction request includes a register processing section indicating an operation to be performed at a journal register allocated to the transaction submitter to store state information of an application. Based on the results of a conflict detection operation performed with respect to the transaction request and on the result of the operation on the journal register, the transaction request is accepted for commit. The value of the journal register is stored at a node of the state management system and provided to the transaction submitter.

21 Claims, 10 Drawing Sheets

(56) References Cited

U.S. PATENT DOCUMENTS

2016/0191622 A1* 6/2016 Aahlad .................. H04L 67/10
                                                     709/201
2017/0026465 A1* 1/2017 Aahlad ............... H04L 67/1048

OTHER PUBLICATIONS

"Stack-oriented programming language", Wikipedia, Retrieved from URL: https://en.wikipedia.org/wiki/Stackoriented_programming_language on Dec. 14, 2015, pp. 1-9.
U.S. Appl. No. 14/316,674, filed Jun. 26, 2014, Allan Henry Vermeulen et al.
U.S. Appl. No. 14/316,630, filed Jun. 26, 2014, Allan Henry Vermeulen.
U.S. Appl. No. 14/316,622, filed Jun. 26, 2014, Allan Henry Vermeulen et al.
U.S. Appl. No. 14/316,619, filed Jun. 26, 2014, Allan Henry Vermeulen.
U.S. Appl. No. 14/482,661, filed Sep. 10, 2014, Allan Henry Vermeulen.
U.S. Appl. No. 14/482,668, filed Sep. 10, 2014, Allan Henry Vermeulen et al.
U.S. Appl. No. 14/753,475, filed Jun. 29, 2015, Allan Henry Vermeulen et al.
U.S. Appl. No. 14/753,505, filed Jun. 29, 2015, Allan Henry Vermeulen et al.
U.S. Appl. No. 14/833,000, filed Aug. 21, 2015, Timothy Daniel Cole et al.

* cited by examiner

REPLICATED STATE MANAGEMENT USING JOURNAL-BASED REGISTERS

BACKGROUND

In recent years, more and more computing applications are being implemented in distributed environments. A given distributed application may, for example, utilize numerous physical and/or virtualized servers spread among several data centers of a provider network, and may serve customers in many different geographical locations. In many cases, particularly in cloud-based computing environments, a given application may involve performing reads and writes at several different data stores, such as various instances of relational databases, non-relational databases, and the like. Some commonly used data store architectures may support the traditional ACID (atomicity, consistency, isolation and durability) properties associated with the relational data model for operations within a given data store, but may not support such properties for groups of operations involving multiple data stores. Other data store architectures may not natively support the ACID property even within groups of operations directed to a single data store instance.

Developers of applications that would benefit from support for transactions that cross data store boundaries are sometimes forced to implement their own state change management mechanisms. Such ad-hoc mechanisms are often hard to maintain, especially as the set of object types at the different data stores evolve based on changing application requirements, and as more features are added to the distributed applications themselves. In some cases, not all the data stores may provide support for the same sets of primitive types, or the same kinds of data manipulation operations, which may further complicate the task of managing complex transactions. Furthermore, given the network delays and various types of failures that may be encountered in typical distributed environments over time, some state change management techniques may not be robust enough to support the service levels required for mission-critical operations. Some storage system applications may also require more sophisticated state change management logic than can be implemented using traditional conflict detection techniques.

Figure 1:
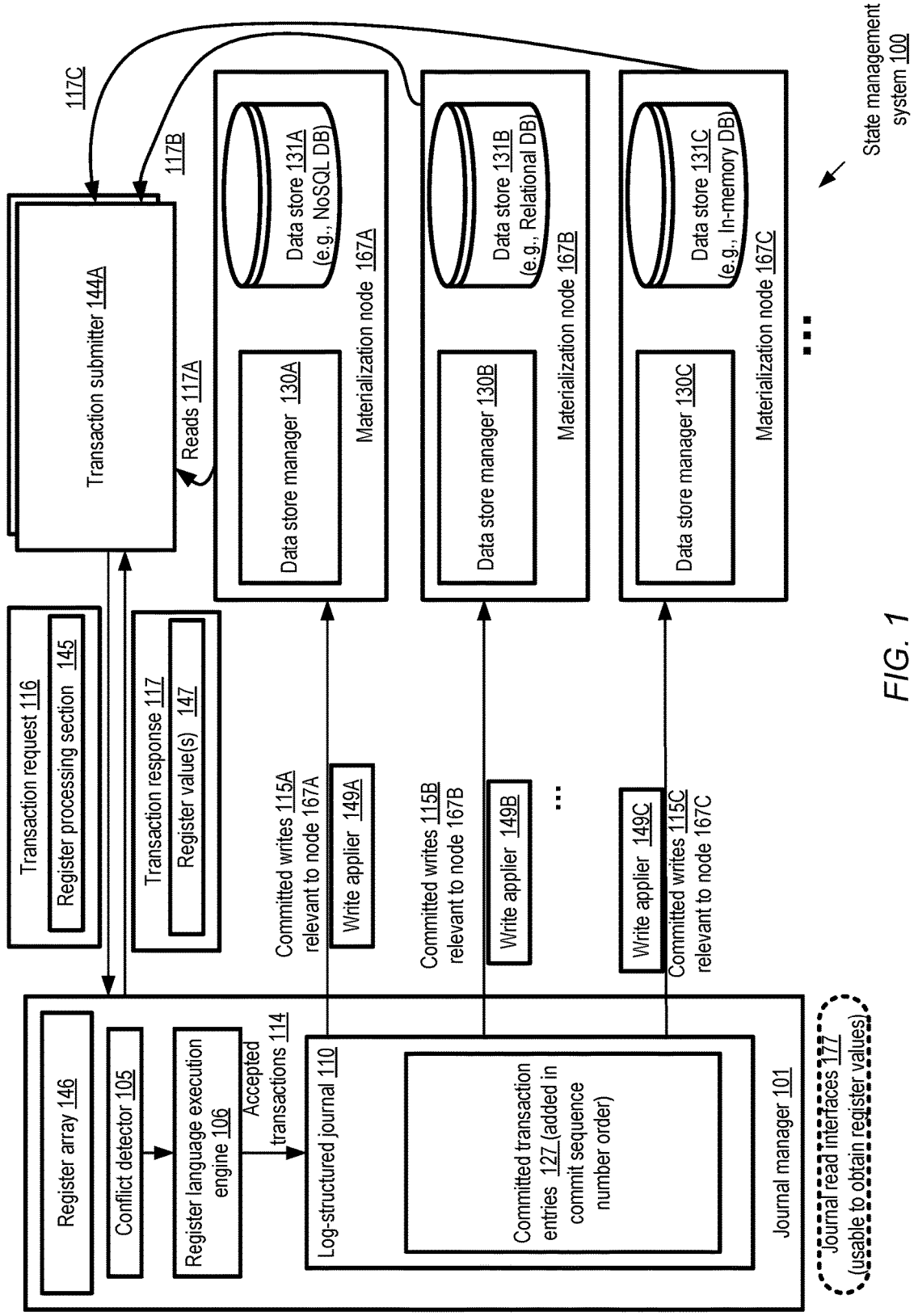
FIG. 1 illustrates an example system environment in which persistent registers may be implemented at a journal for replicated state management of applications, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof

DETAILED DESCRIPTION

Various embodiments of methods and apparatus for supporting replicated state management for distributed applications using journal-based registers are described. In various embodiments, such registers may be materialized by a journal manager responsible for implementing an optimistic concurrency control protocol with respect to transaction requests submitted by client-side components of a multi-data-store storage service or database service, and the state of such registers may be included in the replicated state machines implemented using journal entries as described below. A given journal-based register may, for example, comprise a data object (such as a 64-bit or a 128-bit integer) stored at one or more replication nodes of the journal. An associated register manipulation language defined by the storage or database service may be used to customize commit processing logic for proposed transactions, and/or to store portions of application state information in a persistent manner in some embodiments. It is noted that the journal-based registers, also referred to herein simply as journal registers, which may be read and updated in transaction requests submitted by client-side components of complex distributed applications, differ from processor registers which may form part of the low-level hardware (e.g., at the CPU level) of the computer hosts used for various components associated with the applications and the state management systems for the applications. Journal registers may be referred to as being "persistent" herein because their contents may typically remain accessible across transaction boundaries—e.g., a register value written to in one transaction request may be readable from within a subsequent transaction request.

In at least one embodiment, a group of one or more client processes or instances associated with a given application may be allocated a set of journal registers, e.g., either on demand or automatically when the clients initially establish connectivity to the journal manager. In some embodiments, a plurality of data stores, some of which may implement different data models and data manipulation languages than others, and some of which may materialize different subsets of the database content than others, may be configured as respective materialization nodes or members of the database whose state is managed with the help of registers. Transaction requests representing proposed state changes to the database may be prepared locally and submitted to the journal manager with the help of the client-side components. A client-side component may, for example, include one or more libraries which implement application programming interfaces (e.g., transaction submission APIs including register-related APIs, as well as data store read APIs and/or journal read APIs) supported by the database. In some implementations client-side components may comprise separate threads of execution than the database applications, while in other implementations a client-side component may be loaded as part of a database application process. Client-side components may be considered one example of authorized transaction submitters of the storage service or database service in various embodiments.

A given transaction request may include a number of different elements, including for example respective indicators of the transaction's read set, write set, logical constraints associated with de-duplication (an example of preventing forbidden transactions) or sequencing of transactions, a register processing section, a write payload, and the like as described below in further detail. The journal manager may perform a number of commit processing operations to determine whether a given transaction request is acceptable for commit. Such operations may include read-write conflict detection, for example, to determine whether objects read during the preparation of a transaction request may have been modified by subsequently-committed transactions (whose write sets are indicated in respective committed transaction entries or records appended to the journal). In addition, if the transaction request has one or more logical constraints, the journal manager may check whether any of the constraints are violated by the previously-stored committed transaction records or entries. In one example of a logical constraint, a given transaction T1 may only be committable if one or more previously-submitted transactions such as T2 have already been committed. Such previously-committed transactions may be indicated via respective required transaction signatures in T1's transaction request, and the journal manager may examine stored signatures in a subset of the committed transaction entries of the journal to verify that required transactions have been committed in some embodiments. Another example of a logical constraint may involve forbidden or exclusion signatures—e.g., a given transaction T1 may only be committed if a transaction T3 with a specified forbidden signature has not been committed previously. Such exclusion checks may also be verified by the journal manager using a subset of the committed transaction entries of the journal. Exclusion or forbidden transaction checks (which may be used for de-duplicating transaction requests in some embodiments) and required transaction checks may be considered additional examples of conflict detection for optimistic concurrency control (where the term "conflict" is used in a broad sense) which may be performed by the journal manager, in addition to the core read-write conflict detection operations.

The register processing section of a given transaction request may include various instructions, directives or commands for register-level operations supported by the journal manager, such as commands to read, write update/modify, or perform arithmetic operations on one or more registers. In some embodiments, the journal manager may include a language execution engine responsible for implementing a defined set of operations on the particular set of registers allocated to a transaction submitter. In one embodiment, the register commands may be part of a stack-oriented instruction set defined by or at the journal-based database, e.g., in accordance with a particular push-down automaton. Other languages, such as various types of context-free languages which allow a small set of register operations (such as "set", "get", "increment" and the like) but may not support looping program constructs, and/or may not support function or method calls, may be used in various embodiments. Transaction submitters may be permitted to request the allocation of new registers in some embodiments, or the de-allocation of existing registers. In various embodiments, the transaction requests may indicate various types of transaction commit dependencies on the results of requested register operations. For example, in one transaction request for a transaction T1, the register processing section may indicate that T1 is to be aborted if, as a result of adding a particular value to a specified register R1, the value of R1 would exceed a specified threshold (and that if the updated value of R1 would not exceed the specified threshold and T1 is accepted for commit, the update to R1 should be committed as well). In some embodiments, higher-level abstractions (such as a client-side library supporting counter operations) may be implemented based on the primitive register operations supported by the journal manager, and the transaction requests' register processing sections may be expressed using such abstractions. In one embodiment, a client-side component responsible may compile a register processing section during transaction request preparation, e.g., into byte code or some other executable format which can be run at the journal manager's execution engine. That is, at least a portion of a register processing section of a transaction request may be submitted in an executable form in such embodiments.

In addition to performing read-write conflict detection and logical constraint checking as described above, the journal manager may attempt to perform the operations indicated in the register processing section of a transaction request. Based on the combination of the results obtained for the read-write conflict detection, logical constraint violation detection, and the register processing section, a decision may be made as to whether to accept the transaction for commit or not. If no conflict or violation is detected, and if the journal register operations do not prompt an abort or abandonment of the transaction, the transaction request may be accepted for commit, and a new committed transaction entry corresponding to the transaction request may be appended to the journal. Committed transaction entries of the journal may also be referred to herein as committed transaction records or commit records. In addition, if the transaction is accepted for commit and its register processing section included a write to one or more journal registers, materialized versions of those journal registers (which may be stored at one or more replication nodes of the journal as described below) may be updated accordingly.

In at least one embodiment, the transaction submitter may be provided a response to a given transaction request, indicating whether the transaction was committed or not. Such transaction responses may include the values of some or all of the journal registers to which the transaction submitter is granted access in some embodiments. Consider two example scenarios. A request for transaction T1 includes a register processing directive to increment a journal register R1 (one of a set of two journal registers R1 and R2 allocated to a transaction-submitting client C1) by one, and to abort the transaction if R1's value exceeds 100 as a result of the increment. In one example scenario, R1's value is 56 (and R2's value is 5) when T1's request is received at the journal manager, and in the other example scenario R1's value is 100 (and R2's value is 5) when the request is received. In the first scenario, T1 would be accepted for commit, R1 would be incremented to a value of 57, and the register value set (R1=57, R2=5) may be returned to the submitter in the response to the transaction request. In the second scenario, T1 would be aborted because R1 would exceed 100 if it were incremented. As a result, any changes proposed in T1, including the increment to R1, would not be performed, so the response provided to the transaction may include (in addition to an indication that the transaction was not committed) the register value set (R1=100, R2=5). In some embodiments, a transaction submitter or other authorized component may be able to retrieve the values of registers via read programmatic interfaces supported by the journal manager. In one embodiment, only the value of the journal registers to which updates were directed in the transaction request may be provided to the transaction submitter (e.g., R2 values may not be provided in the above example scenarios).

In various embodiments, the committed transaction entries of the journal may each include a respective commit sequence number, indicative of the order in which the journal manager processed the corresponding transaction requests. Such sequence numbers may be used to delimit the set of committed transaction entries to be examined for conflict detection in various embodiments as discussed below in further detail. If the journal contents are being materialized at data stores at one or more materialization nodes, each materialization node may have an associated write applier responsible for examining the entries of the journal sequentially and propagating the relevant writes (i.e., those writes which are to be recorded at that materialization node) to the materialization node. In some embodiments, register values may be read by the write appliers from the journal (e.g., as part of committed transaction entries) and used to update data objects at one or more materialization nodes. The optimistic concurrency control algorithm implemented by the journal manager may enable higher transaction rates to be sustained for at least some types of applications than would have been possible using traditional locking-based concurrency control techniques, especially in environments where the level of contention (which leads to read write conflicts) is low. The support for register operations as part of transaction requests may enable more complex commit processing logic to be supported than if only read-write conflict detection and logical constraint violations associated with specific transaction signatures were permitted. At the same time, restricting the types of register manipulations allowed (e.g., by prohibiting loops or method calls in the register processing sections of the transaction requests) may help ensure that the probability of over-burdening a journal manager by excessive register-related computations is kept fairly low in various embodiments.

In some embodiments, a given journal and its associated journal manager may be implemented using a plurality of nodes. For example, journal contents (e.g., the committed transaction entries) may be replicated at various nodes of a directed acyclic graph (each of which may be implemented at respective hosts in some implementations), and the values of the registers may be materialized at one or more of such replication nodes. In one embodiment, for example, the set of replication nodes of the journal may include at least an acceptor node and a committer node, and both nodes may be required to replicate a respective commit record before the corresponding transaction's commit is considered successful or complete. In one implementation, the conflict detection, logical constraint violation detection and register processing may be performed at the acceptor node, and an array of registers may be materialized at least at the acceptor node.

In various embodiments, a journal may be organized as a collection of one or more journal logical partitions, with each journal partition being assigned or allocated to a group of one or more applications and/or associated transaction submitters. Each journal logical partition may have an associated namespace, and the set of registers accessible to the clients and/or other transaction submitters of the partition may be defined within the associated namespace. Committed transaction entries or records of several different journal logical partitions may be stored at the same replication host in some embodiments, thus supporting multi-tenancy with respect to journal entries. In some embodiments in which the journal is logically partitioned, a respective array of registers may be defined for each partition and materialized at the acceptor node (and/or other nodes) corresponding to that logical partition.

A wide variety of data store types may be configured as members of such a journal-based state management system in different embodiments, including for example one or more instances of relational databases, non-relational or NoSQL databases, in-memory databases, object-oriented databases, storage services which provide web-service interfaces to data objects, storage services which provide block-level programmatic interfaces, and the like. Each data store instance or materialization node may have a corresponding data store manager, implemented for example using some collection of hardware and/or software components, configured to support a respective set of programmatic interfaces in accordance with the syntax and semantics of the associated data store type. In at least some embodiments, for example, some data stores may present different interfaces for read operations, and a client-side component may submit reads to different data stores via their respective read interfaces on behalf of an application. The data stores configured at a given time for transaction or state management via a given journal of a multi-data-store database may be referred to as "member" data stores of that database as of that time. The terms "multi-data-store database" and "multi-data-store storage system" may be used synonymously herein. Member data stores may leave or join the journal-based state management system over time in some embodiments. Of course, a given state management system, storage system or database may, at least at some points in time, comprise just a single member data store—that is, while multiple members may be permitted, the storage system may not be required to have multiple members. In various embodiments, some of the primitive data types supported at one member data store may not be supported at another. For example, integer values may be stored using 64 bits in one data store, and using 32 bits in another. Similarly, the implementation and precision of real numbers may differ from one data store to another. The manner in which text variables or attributes are handled may differ across data stores in some cases—e.g., the maximum supported length of a character array may differ, support for variable-length character arrays or strings may differ, and so on. The details of the implementation of binary objects (e.g., "blobs"), such as the maximum size of binary objects, etc., may differ from one store to another. Some data stores may not offer the same kinds of data manipulation operations as others. Furthermore, in at least some embodiments, the kinds of indexes, constraints and/or other metadata objects which may be supported may differ from one data store to another. In various embodiments, a data-store-independent or data-store-agnostic transaction language may be employed for transaction requests submitted to the journal manager, e.g., to ensure that such differences among the different data stores can be managed. A common journal schema may be employed in some embodiments, indicating rules regarding acceptable transaction requests (including the permitted register operations) which can be offered to the journal manager by client-side transaction-submitting components.

Example System Environment

FIG. 1 illustrates an example system environment in which persistent registers may be implemented at a journal for replicated state management of applications, according to at least some embodiments. State management system 100 includes a journal manager 101 of a log-structured journal 110 that may be used to store records of state changes of a multi-data-store database. The journal manager 101 may be implemented using one or more computing devices in various embodiments. The journal may be described as being log-structured in the depicted embodiment in that it may comprise an append-only sequence of entries, with in-place modification of entries not permitted. The journal may comprise committed transaction entries 127 stored in the order in which the corresponding transactions or state changes proposed by transaction submitters 144 (e.g., 144A) of state management system 100 were approved, e.g., in increasing order of commit sequence numbers. The database may include one or more materialization nodes 167, such as 167A-167C, at each of which at least a subset of the database contents are materialized. Each materialization node may include a respective data store 131 (e.g., data stores 131A-131C) and a corresponding data store manager (DSM) 130 (e.g., DSMs 130A-130C) implemented at one or more computing devices.

The data stores 131 may be referred to as member data stores of the database or storage system whose state is managed at system 100. The member data stores 131 may differ from each other in various characteristics such as their supported data models and/or data manipulation languages, level of data consistency supported, transaction support, data persistence/durability level, and the like. Each of the data stores may be registered or configured for transaction management by the journal manager 101 in the depicted embodiment. The terms "concurrency control" and "transaction management" may be used as synonyms herein with respect to the state change management functionality provided by the journal manager. In effect, the journal manager may be responsible for implementing a replicated state machine corresponding to one or more database applications, with the committed transaction entries expressing state changes in a data-store-independent language in the depicted embodiment. The journal manager may also be referred to as a state manager.

The term "data store", as used herein, may refer to an instance of any of a wide variety of persistent or ephemeral data repositories and/or data consumers. For example, some data stores such as 131A may comprise persistent non-relational databases that may not necessarily provide native support for multi-item transactions, while other data stores such as 131B may comprise persistent relational databases that may natively support multi-item transactions. In some embodiments, a network-accessible storage service of a provider network that enables its users to store unstructured data objects of arbitrary size, accessible via a web-services interface, may be registered as one of the data stores. Other types of data stores may comprise in-memory databases such as 131C, instances of a distributed cache, network-accessible block storage services, file system services, and the like. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance. The journal manager 101 may itself be implemented as part of a network-accessible distributed state management service of a provider network in some embodiments.

In the depicted embodiment, transaction-submitting client-side components 144 of the database may construct transaction requests 116 locally (e.g., at hosts used for running processes implementing a database application), and then submit (or "offer") the transaction requests for approval and commit by the journal manager 101. In one implementation, for example, a client-side library may enable an application 146 to initiate a proposed transaction by issuing the logical equivalent of a "transaction-start" request. Within the candidate transaction, the application may perform some number of reads on a selected set of objects at data stores 131, and locally (e.g., in local memory) perform a proposed set of writes directed at one or more data stores. The application may then submit the proposed transaction by issuing the equivalent of a "transaction-end" request. A given transaction request 116 may include a number of elements in various embodiments as discussed below in further detail, including for example a register processing section 145, an indication of a read set and write set of the transaction, a write payload, and so on.

The state information maintained by the journal manager 101 may include a register array 146 comprising a plurality of registers in the depicted embodiment. For example, each register may comprise a 128-bit or 64-bit integer. Different sets of registers may be assigned or allocated to different sets of transaction submitters 144, e.g., to be used for customizing the commit processing logic for transaction requests 116 and/or to store portions of the corresponding applications' state. In various embodiments, a register manipulation language defined by the journal manager or the journal service may be used to express operations directed at one or more registers of array 146 in the register processing section 146 of a transaction request. The journal manager may include a register language execution engine 106 used for carrying out the operations indicated in the register processing sections 146 of submitted transactions. In some embodiments, the register manipulation language may support a smaller set of operations than many modern high-level programming languages—e.g., a simple stack-based instruction set for register operations may be supported in some embodiments, which does not allow looping programming constructs, method/function calls, etc. Examples of the kinds of primitive instructions which may be supported for registers of array 146 in various embodiments, as well as abstractions that may be built using such primitives, are discussed below in the context of FIG. 5.

The decision as to whether to commit a requested transaction may be made based on various factors. In the depicted embodiment, a transaction request 116 may first be processed by a conflict detector 105 of the journal manager 101, e.g., to determine whether the reads of the transaction conflict with writes of previously-committed transactions represented in committed transaction entries 127, and/or to determine whether any logical constraints of the proposed transaction are violated. Details of the kinds of conflict detection operations and logical constraint violation detection operations that may be performed in various embodiments are provided below. As mentioned above, in at least some embodiments, a given transaction request 116 may include a read set descriptor indicating one or more reads (e.g., reads 117A, 117B or 117C) respectively from one or more data stores, and a write set descriptor indicating proposed writes which may eventually be propagated to one or more data stores, where the set of data stores that are read in the transaction may or may not overlap with the set of data stores affected by the writes. The reads may be performed using the native programmatic read interfaces of the data stores in some embodiments. The transaction requests 116 may be formatted in accordance with a data-store-independent transaction language in various embodiments, e.g., a language defined in a journal schema associated with journal manager 101.

At least some of the writes indicated in a given transaction request may be dependent on the results of one or more of the reads in some embodiments. For example, a requested transaction may involve reading one value V1 from a location L1 at a data store DS1, a second value V2 from a second location L2 at a data store DS2, computing a function F(V1, V2) and storing the result of the function at a location L3 at some data store DS3. In some locking-based concurrency control mechanisms, exclusive locks may have to be obtained on L1 and L2 to ensure that the values V1 and V2 do not change before L3 is updated. In contrast, an optimistic concurrency control mechanism may be used by the journal manager 101 of FIG. 1, in which no locks may have to be obtained. Instead, in the depicted embodiment, the conflict detector 105 may determine, based at least in part on the contents of the transaction request and on a set of committed transaction entries of the journal 110, whether one or more of the data items read in the requested transaction may have been updated since they were read from their respective data stores. A sequence number based technique may be used to determine whether such read-write conflicts exist in at least some embodiments, as described below in further detail.

If the conflict detector 105 determines that none of results of the proposed transaction's reads have been affected by subsequently committed writes, additional checks for logical constraint violations and register operations that might potentially result in transaction abandonment may be performed in at least some embodiments. For example, if the transaction request includes a "required transaction signature", the conflict detector 105 (or some other component of the journal manager configured to perform logical constraint checking) may check whether a transaction with that signature has been committed. If the requires transaction has not been committed, the request 116 may be rejected. Similarly, in some embodiments a transaction may include a "forbidden transaction signature", and the journal manager may check (e.g., by examining some set of committed transaction entries 127) whether a transaction with that signature has already been committed or not. If the forbidden transaction has been committed, the requested transaction may also be rejected.

The register processing section 145 of the proposed transaction may include one or more instructions to update (or read) specified registers, and to take actions such as aborting/abandoning the transaction based on the register update results or the register read results in the depicted embodiment. For example, the register processing section may direct the journal manager to increment the value stored in a particular register R1 of array 146, and to abort the transaction if the resulting value of R1 exceeds a threshold. The register language execution engine 106 may perform the requested register updates provisionally in the depicted embodiment, such that the register updates are only committed if the requested transaction is not aborted. In some embodiments, the read-write conflict detection and logical constraint violation detection operations for a given transaction request 116 may be performed before the register processing section 145 is executed. In other embodiments, a different ordering may be employed with respect to read-write conflict detection, logical constraint checking, and register processing, or at least some of the three types of commit processing operations (read-write conflict detection, logical constraint checking and register processing) may be performed in parallel. It is noted that at least one of the three types of commit processing operations may not be required for some transaction requests in various embodiments. For example, a transaction request may include a null read set, in which case read-write conflict detection may not be required. Some transaction requests may not include logical constraint descriptors, in which case checking for violations of logical constraints may not be required. Other transaction requests may not include register processing sections.

If no read-write conflicts are detected, no logical constraints would be violated if the transaction request 116 were accepted for commit, and the register operations indicated in register processing section do not require abandonment of the proposed transaction, the transaction request may be accepted for commit in the depicted embodiment. A committed transaction entry 127 representing such an accepted-for-commit transaction 114 may be appended to the journal 110. In addition, if the register processing section included a write to a register, a materialized version of that register may be updated accordingly. In some embodiments, at least a portion of the register processing section (or the corresponding register values) may be included in the committed transaction entry, e.g., together with other elements of the transaction request. The terms "approve" and "accept" may be used as synonyms herein with respect to requested transactions that are not rejected.

This type of approach to concurrency control may be deemed optimistic in that decisions as to whether to proceed with a set of writes of a transaction may be made initially under the optimistic assumption that read-write conflicts are unlikely, that logical constraint violations are unlikely, and that requested register manipulations are unlikely to require transaction abandonment. As a result, in scenarios in which these assumption are typically valid, higher throughputs and lower response times may be achieved than may be possible if more traditional locking-based techniques are used. In the case where a transaction is accepted for commit, in some embodiments contents of a corresponding journal entry 127 may be replicated at some number of nodes of a replication graph (as described below in further detail with respect to FIG. 2) in the depicted embodiment before the commit is considered successful. In some embodiments, the requesting client-side transaction submitter component 144 may be notified when the requested transaction is committed, e.g., in the form of a transaction response 117 which includes the register values 147 resulting from the operations of the register processing section. In at least one embodiment, the client-side component 144 may be informed when a transaction is rejected, so that, for example, a new transaction request may be generated and submitted for the desired updates. The rejection response may also include, for example, the values 147 of the registers (without incorporating any requested register updates included in the transaction request, since those changes were not applied as a result of the rejection of the transaction). In at least some embodiments, instead of or in addition to obtaining the register values in transaction responses 117, a transaction submitter 144 may obtain values of one or more registers using journal read interfaces 177.

For each transaction that is committed, in at least some embodiments a commit sequence number (or some other identifier indicative of the commit) may be generated and stored as part of the corresponding journal entry. Such a commit sequence number may, for example, be implemented as a counter or as a logical timestamp. The commit sequence number may be determined by the conflict detector in some embodiments, or at a different component associated with the journal (such as the committer node of a replication graph being used) in other embodiments.

In the depicted embodiment, after a given transaction is committed and its entry is stored at the journal, at least some of the writes of the transaction may be applied or propagated to one or more of the materialization nodes 167. Some of the writes may involve register values—for example, one of the writes may comprise setting the value of a data attribute to that of one of the registers of array 146. Different subsets of the committed writes may be of interest to, or relevant to, different materialization nodes in some embodiments, as indicated by arrows 115A-115C. In some implementations, the writes may be applied in an asynchronous fashion to the materialization nodes. In such implementations, there may be some delay between the time at which the transaction is committed and the time at which the payload of a particular write operation of the committed transaction reaches the corresponding data store. In some embodiments, respective asynchronous write appliers 149 (e.g., write appliers 149A-149C) may be used to propagate some or all of the writes to relevant data stores. In one embodiment, the write appliers may be components of the journal manager 101, while in other embodiments the write appliers may be components of the data store managers 130, and may represent respective cursors on the journal. In some embodiments, a given write applier may be responsible for propagating writes to more than one data store, or a single data store may receive writes from a plurality of write appliers. In at least one implementation, a pull technique may be used to propagate written data to the data stores—e.g., one or more data stores may submit requests for writes to the journal manager or the write appliers, instead of being provided written data at the initiative of the write appliers. After the data written during a transaction is applied to the corresponding data stores, client-side components such as transaction submitters 144 may be able to read the updated data using the respective read interfaces of the data stores. In some embodiments, at least one of the write appliers may be capable of performing synchronous writes (e.g., either when explicitly directed to do so by the journal manager or a data store manager, or for all the writes for which the applier is responsible).

In at least one embodiment, the journal manager may implement respective sets of read and write programmatic interfaces (e.g., application programming interfaces or APIs). The journal manager's write interfaces may be used by authorized entities (such as transaction submitters 144) to submit transaction requests, while the read interfaces 177 may be used by various authorized entities (e.g., including write appliers and/or the transaction submitters) to read contents of journal entries 127, register array 146 and the like. In at least one embodiment, a data store manager 130 may be authorized to invoke the journal manager's write interfaces—e.g., by submitting certain types of transaction requests. Thus, in such embodiments, a data store manager may act as a transaction-submitting client-side component as well as a consumer or reader of journal entries.

In at least one embodiment, the journal manager 101 may provide an indication of the latest committed state of the database (such as the highest commit sequence number generated thus far), e.g., in response to a query from a data store manager or a query from a transaction submitter. The write appliers 149 may indicate the commit sequence numbers corresponding to the writes that they apply in various embodiments. Thus, at any given point in time, a transaction submitter may be able (e.g., by querying the data store managers) to determine the commit sequence number corresponding to the most-recently-applied write at a given materialization node 167. In at least some embodiments, during the generation of a transaction request 116, the most-recently-applied commit timestamps may be obtained from the data stores that are accessed during the transaction, and one or more of such commit sequence numbers may be indicated in the transaction request as the conflict check delimiter. For example, consider a scenario in which, at the time that a particular client-side component 132 initiates a transaction that includes a read of a location L1 at a data store DS1, the commit sequence number corresponding to the most recently applied write at DS1 is SN1. Assume further that in this example, the read set of the transaction only comprises data of DS1. In such a scenario, SN1 may be included in the transaction request 116. The conflict detector 105 may identify journal entries with sequence numbers greater than SN1 as the set of entries to be examined for read-write conflicts for the requested transaction. If any of the write sets of the identified commit records overlaps with the read set of the requested transaction, the transaction may be rejected/aborted; otherwise, the transaction may be considered free of read-write conflicts in this example scenario. Similar sequence number-based delimiters may be used for logical constraint checking in some embodiments, as discussed in further detail below.

The optimistic concurrency control mechanism illustrated in FIG. 1 may allow more complex types of atomic operations to be supported than may have been possible using the underlying data stores' concurrency control mechanisms in at least some scenarios. For example, some high-performance non-relational data stores may only allow single-item transactions (i.e., writes may be permitted one at a time, but if multiple writes are submitted in a single batch update, atomicity/consistency guarantees may not be provided for the multiple writes taken together). With the journal-based approach described above, a single transaction that encompasses writes to multiple locations of the non-relational data store (and/or other data stores as well) may be supported with relative ease.

Replication Graphs

Figure 2:
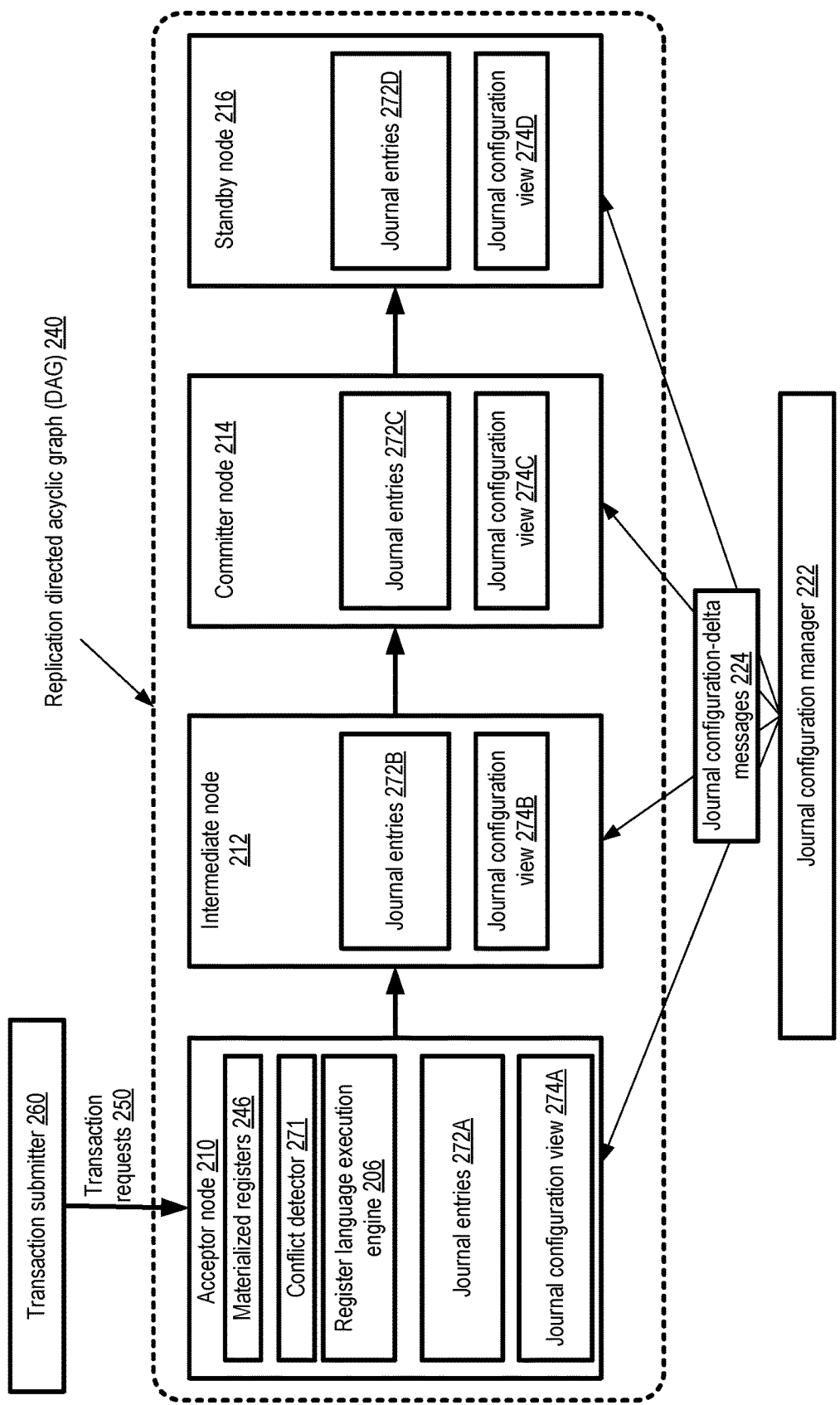
FIG. 2 illustrates an example replication directed acyclic graph (DAG) which may be used to implement a journal used for storing committed transaction entries of a state management system, according to at least some embodiments.

In some embodiments, at least some contents of the journal used for state management may be replicated for enhanced data durability and/or higher levels of availability. FIG. 2 illustrates an example replication directed acyclic graph (DAG) which may be used to implement a journal used for storing committed transaction entries of a state management system, according to at least some embodiments. In general, a replication DAG 240 may include one or more acceptor nodes 210 to which transaction requests 250 may be transmitted by submitters 260, one or more committer nodes 214, zero or more intermediary nodes 212 each positioned along a replication pathway comprising DAG edges leading from an acceptor node to a committer node, and zero or more standby nodes 216 that are configured to quickly take over responsibilities of one of the other types of nodes in the event of a node failure. In various embodiments, the functionality of the journal manager described above may be distributed among subcomponents at one or more of the replication DAG nodes. In the embodiment depicted in FIG. 2, the acceptor node includes a set of materialized registers 246, a register language execution engine 206, and the conflict detector 271 of the journal manager. In other embodiments, instead of being incorporated within an acceptor node, the conflict detector and/or the register-related components may be implemented separately. The materialized registers 246 may comprise, at any given point in time, the current values or contents of the registers, representing the accumulated set of changes applied to the registers in the register processing sections of committed transactions. In at least one embodiment, materialized registers may be replicated at several nodes of DAG 240 at respective persistent storage devices.

In at least some embodiments, each node of a particular replication DAG such as 240 may be responsible for replicating journal entries. The journal entries may be propagated along a set of edges from an acceptor node to a committer node of the DAG along a replication pathway. In FIG. 2, the current replication pathway starts at acceptor node 210, and ends at committer node 214 via intermediary node 212. For a given journal entry (e.g., an entry indicating a committed data object modification), one replica may be stored at each of the nodes along the replication path, e.g., in journal entries 272A, 272B and 272C. Each journal entry propagated within the DAG may include a respective sequence number or a logical timestamp that is indicative of an order in which the corresponding transaction request was processed (e.g., at the acceptor node 210). When a particular journal entry reaches a committer node, e.g., after a sufficient number of replicas of the entry have been saved along the replication pathway, the corresponding transaction may be explicitly or implicitly committed. In some embodiments, the changes to the materialized registers 246 indicated in a given transaction request may be applied only after the transaction is committed—e.g., after the journal entry for the transaction request has reached the committer node and a sufficient number of replicas of the journal entry have been made. If for some reason a sufficient number of replicas cannot be created, the journal entries may be logically and/or physically removed (e.g., by setting a "removed" flag) in some embodiments from the nodes (if any) at which they have been replicated thus far, and the proposed register changes (if any) associated with the transaction may not be materialized. After a commit, the writes of a transaction may be propagated or applied to a set of destinations (such as storage devices at which the contents of the member data stores are located) as described earlier, e.g. by respective write appliers. In some implementations, only a subset of the DAG nodes may be read in order to propagate committed writes to their destinations. In other embodiments, journal entries may be read from any of the DAG nodes. In at least one embodiment, write appliers may be implemented as respective threads or processes that may run at the same hosts at one or more of the DAG nodes. In other embodiments, write appliers may run on different hosts than the DAG nodes. A journal entry may also be transmitted eventually to standby node 216, and a replica of it may be stored there after it has been committed, so that the standby node 216 is able to replace a failed node of the DAG quickly if and when such a failover becomes necessary.

A journal configuration manager 222 may be responsible for managing changes to DAG configuration (e.g., when nodes leave the DAG due to failures, or join/re-join the DAG) by propagating configuration-delta messages 224 asynchronously to the DAG nodes in the depicted embodiment. Each configuration-delta message may indicate one or more changes to the DAG configuration that have been accepted or committed at the journal configuration manager 222. In some embodiments, each replication node may implement a respective deterministic finite state machine, and the journal configuration manager may implement another deterministic finite state machine. The journal configuration manager may be implemented as part of the journal manager which is also responsible for the optimistic concurrency control protocol described above.

The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for transaction record propagation may work correctly even if some of the nodes along a replication pathway have a different view of the current configuration of the journal DAG than other nodes. In FIG. 2, each of the nodes may update its respective journal configuration view 274 (e.g., 274A, 274B, 274C or 274D) based on the particular sequence of configuration-delta messages 224 it has received from the configuration manager 222. It may thus be the case, in one simple example scenario, that one node A of a DAG 240 continues to perform its state transition processing responsibilities under the assumption that the DAG consists of nodes A, B, C and D in that order (i.e., with a replication pathway A-to-B-to-C-to-D), while another node D has already been informed as a result of a configuration-delta message that node C has left the DAG, and has therefore updated D's view of the DAG as comprising a changed pathway A-to-B-to-D. The configuration manager may not need to request the DAG nodes to pause processing of transactions and corresponding journal entries in at least some embodiments, despite the potentially divergent views of the nodes regarding the current DAG configuration. Thus, the types of "stop-the-world" configuration synchronization periods that may be required in some state replication techniques may not be needed when using replication DAGs of the kind described herein to implement persistent journals for distributed transaction management. Although a linear replication pathway is shown in FIG. 2, in general, a replication pathway may include branches at least at some points of time (e.g., during periods when some DAG nodes have received different configuration delta messages than others). Under most operating conditions, the techniques used for propagating DAG configuration change information may eventually result in a converged consistent view of the DAG's configuration at the various member nodes, while minimizing or eliminating any downtime associated with node failures/exits, node joins or node role changes. It is noted that in some embodiments, journal entries may be stored without using the kinds of replication DAGs illustrated in FIG. 2.

In at least some embodiments, the nodes of a replication DAG may each be implemented as a respective process or thread running at a respective host or hardware server. The hosts themselves may be physically dispersed, e.g., within various data centers of a provider network. In one embodiment, a provider network at which journal-based transactions are implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. In some such embodiments, one or more nodes of a replication DAG 240 may be implemented at a different availability container than other nodes of the replication DAG, thereby increasing the robustness and durability of the journal.

Journal Logical Partitions

Figure 3:
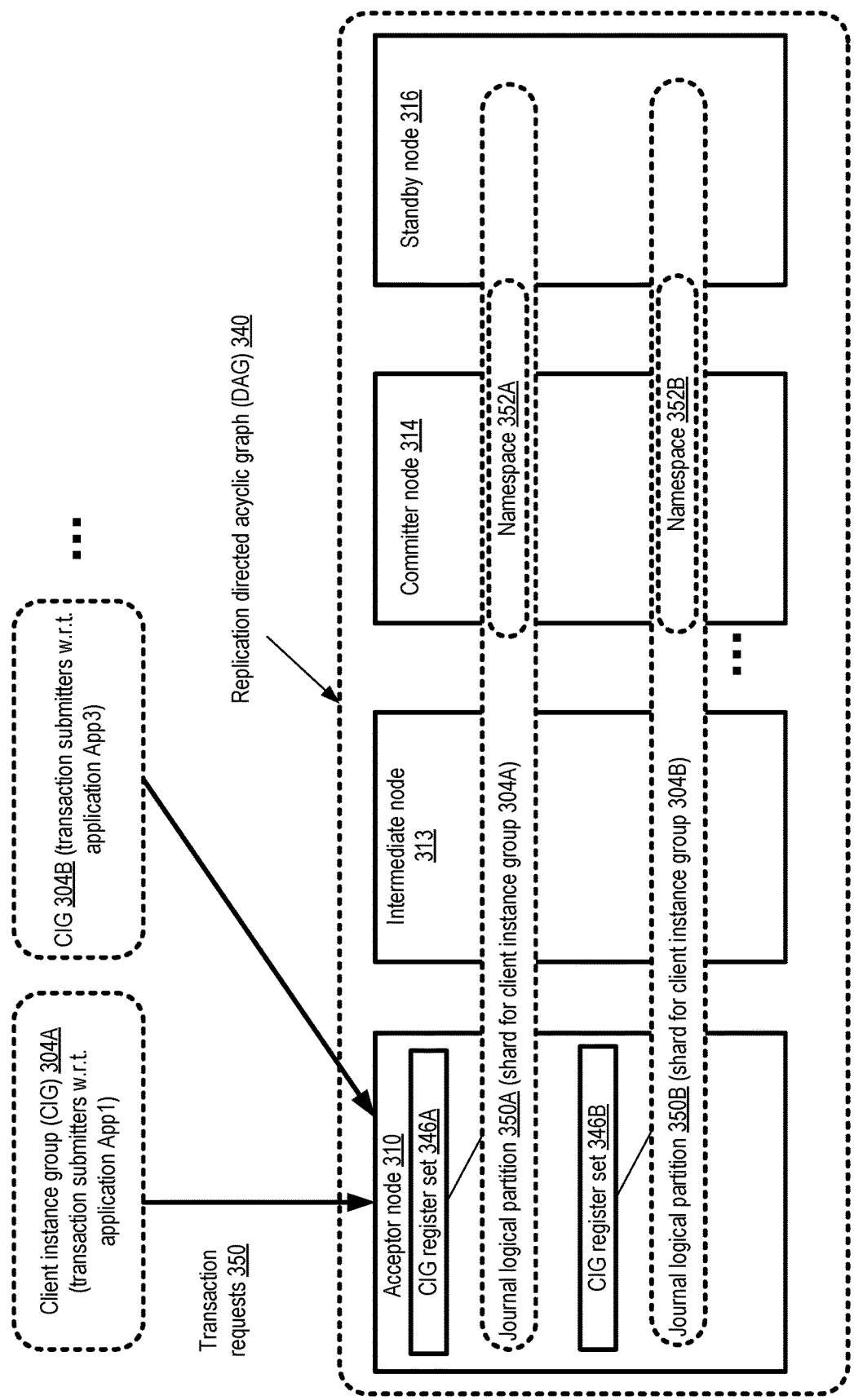
FIG. 3 illustrates example journal logical partitions with associated namespaces which may be implemented for respective groups of client instances of a state management system, according to at least some embodiments.

In at least one embodiment, a journal used for state management may be subdivided into logical partitions which share underlying hardware devices (e.g., hosts and/or storage devices). Each such journal logical partition may be used, for example, for a different application or a group of related applications, with the state information stored in each journal logical partition being kept isolated from the state information stored in any other journal logical partition. Journal logical partitions may also be referred to as journal shards in some embodiments. FIG. 3 illustrates example journal logical partitions with associated namespaces which may be implemented for respective groups of client instances of a state management system, according to at least some embodiments. Replication DAG 340 comprises acceptor node 310, intermediate node 313, committer node 314, and standby node 316 in the depicted embodiment. Each of the DAG nodes may be implemented or executed at a separate host in some implementations. Using respective journal logical partitions 350 (e.g., 350A or 350B) whose contents are physically distributed among the illustrated set of DAG nodes, replicated state management for several different applications may be performed. For example, journal logical partition 350A may be assigned to a client instance group (CIG) 304A associated with an application App1, while journal logical partition 304B may have been established for client instance group 304B associated with a different application App2. Each CIG may comprise one or more authorized transaction submitters (e.g., client processes or threads of execution) for the corresponding application.

Each journal logical partition may have an associated namespace isolated from the namespaces of other journal logical partitions, such as namespaces 352A and 352B of journal logical partitions 350A and 350B respectively. Each namespace 352 may be used to identify or define respective sets of state management objects and entities, such as respective sets of journal registers, transaction identifiers, client identifiers and the like. For example, one set of journal registers 346A may be defined in namespace 352A for CIG 304A, and a second set of journal registers 346B may be defined in namespace 352B for CIG 304B in the depicted embodiment. In one example implementation, register set 346A may include 1024 64-bit registers R0-R1023 within the scope of namespace 352A, while register set 346B may include an additional 1024 64-bit registers R0-R1023 within the scope of namespace 352B. When referring to a given journal register in a register processing section of a transaction request, a transaction submitter may use the register identifiers (e.g., R0-R1023) defined in the namespace of the journal logical partition assigned to the CIG to which the transaction submitter belongs. Different transaction submitters of a given CIG may access the same registers—e.g., one submitter may write to a particular register, which can then be read (assuming the transaction with the write is committed) by a different transaction submitter of the CIG, or overwritten in a subsequent transaction by a different transaction submitter of the CIG. In one embodiment, the register language usable to prepare transaction requests may include operations to share access to a given register of a namespace—e.g., an authorized transaction submitter may request that read and/or write access to a particular register (or some set of registers) be granted to another transaction submitter, thereby potentially expanding the client instance group associated with the namespace of that register.

In one embodiment, the number of registers allocated for different journal logical partitions may not be identical—e.g., based on the needs of the corresponding applications, the number of client instances, etc., some journal logical partitions may have fewer registers than others at a given point in time. The data types, widths (e.g., number of bits used per register) and/or the total number of registers may differ from one journal logical partition to another in some embodiments—e.g., register set 346A may comprise 1024 64-bit integer-valued registers, while register set 346B may comprise 512 128-bit integer registers. In one embodiment, the role of a given node (e.g., among the roles of acceptor node, intermediate node, committer node and standby node) may differ with respect to one journal logical partition than another—e.g., a node designated as an acceptor node for one journal logical partition may act as a committer node for a second journal logical partition and/or as an intermediary node for a third journal logical partition. In some embodiments, the materialized versions of the register sets of a given logical partition may be stored at the acceptor node for that logical partition, while in other embodiments, the registers may be materialized at several different nodes.

In some embodiments, when a given application (or one of its client instances) first connects to or registers with the journal service, a particular journal logical partition may be assigned to it, and a default set of registers associated with that partition may be allocated for use by the application and its client instances. In some implementations, a new journal logical partition may be created or established for each application, while in other embodiments a given journal logical partition may be re-used or recycled (e.g., after one application has terminated, its partition may be assigned to a different application). The journal manager may maintain metadata indicating the mappings between applications, CIGs and journal logical partitions in various embodiments.

Journal-based registers may be used to store critical portions of application state during bootstrap or initialization phases of the applications in some embodiments. A particular application process may act as a transaction submitter and store contents of application state during one stage of the bootstrap to the set of registers allocated for the application. Those registers may be read during one or more subsequent stages of the bootstrap procedure, and/or to enable faster recovery in the event of a failure during the bootstrap procedure in one embodiment. In effect, in such embodiments, in addition to or instead of being used for commit processing decisions, the journal-based registers may be used as a highly available persistent repository for small amounts of application state information at various stages of an application's lifecycle.

Transaction Requests

Figure 4:
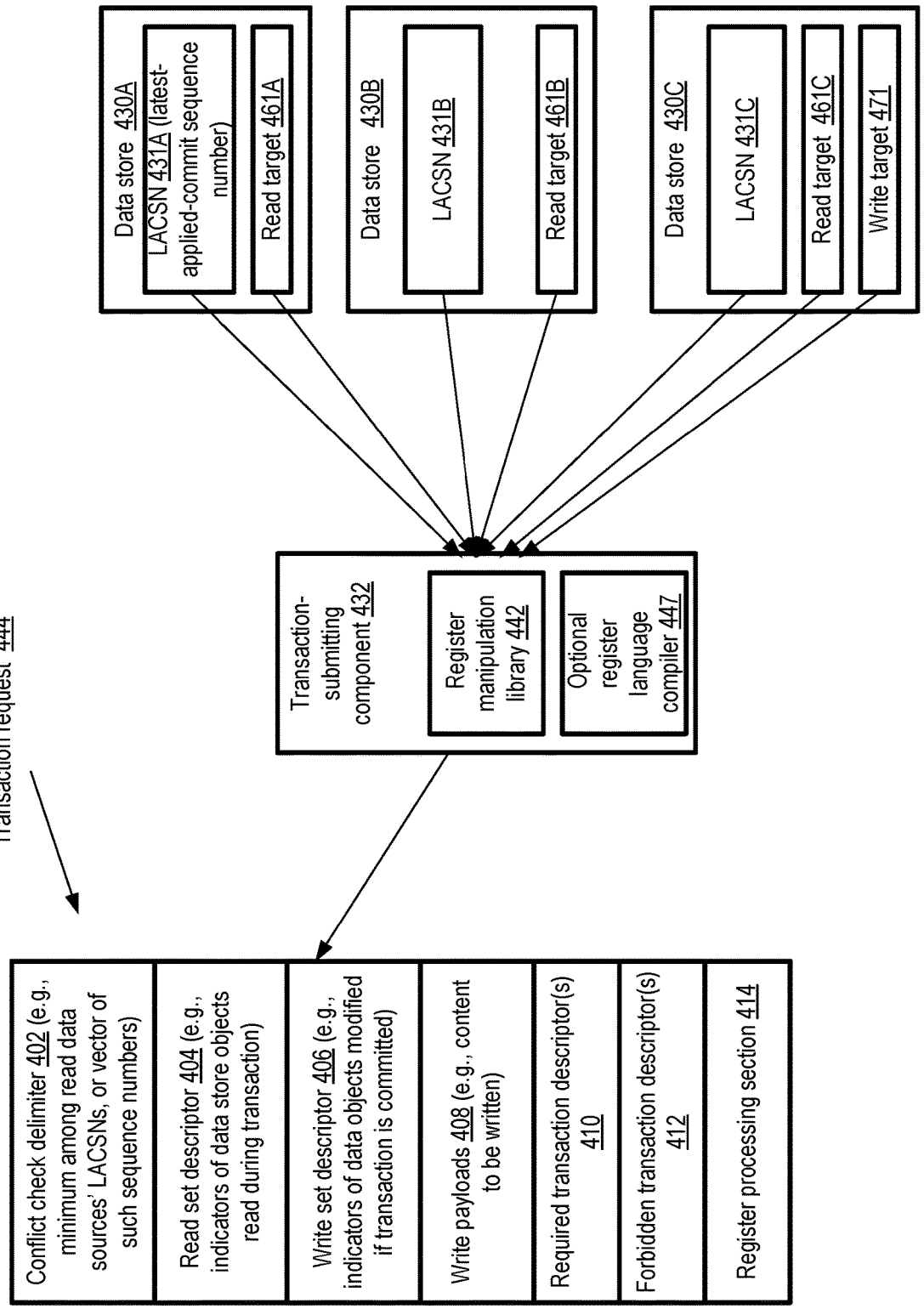
FIG. 4 illustrates an overview of transaction requests which may be submitted to a journal manager implementing an optimistic concurrency control protocol, according to at least some embodiments.

FIG. 4 illustrates an overview of transaction requests which may be submitted to a journal manager implementing an optimistic concurrency control protocol, according to at least some embodiments. As shown, a transaction request 444 may include some combination of a conflict check delimiter 402, a read set descriptor 404, a write set descriptor 406, write payload(s) 408, logical constraint descriptors (such as required transaction descriptors 410 or forbidden transaction descriptors 412), and/or a register processing section 414 in the depicted embodiment. In various embodiments, transaction requests 444 may include other elements not shown in FIG. 4, such as a version number of a data-store-independent transaction language or journal schema used to formulate the transaction request, the type of transaction (e.g., whether the transaction includes a write operation directed to a data object or to a journal schema), etc. In some embodiments, authorization to submit transaction requests similar to request 444 may be granted to data store managers at various materialization nodes, as well as to client-side components of the database.

In the depicted embodiment, a transaction-submitting component 432 may comprise one or more client libraries which may be utilized to assemble or prepare the transaction request. For example, a register manipulation library 442 may provide programmatic interfaces for various register-level operations such as those described below in the context of FIG. 5. In at least one embodiment, the transaction-submitting component 432 may include or have access to an optional register language compiler 447, which may be used to generate an executable version of a register processing section for inclusion in a transaction request.

In at least some embodiments, the transaction submitter may automatically record information about the read targets 461A, 461B, and 461C respectively within data stores 430A, 430B and 430C from which data is read during the transaction. In some embodiments, the read set descriptor 404 may be generated by applying transformation functions (e.g., hash functions) to the read query predicates. For example, if a read request logically equivalent to the SQL (Structured Query Language) statement "select salary from EmployeeTable where (name equals 'Alan') or (employeeID equals '123')" were issued by the transaction-submitter 432, the following procedure may be used to represent the portion of the read set corresponding the select statement in one implementation. First, the query predicates (name equals 'Alan') or (employeeID equals '123') may be normalized into a tuple (e.g., 'name:Alan,employeeID:123') expressed in a particular format indicated in journal schema 943. Then, a hash function or other transformation function (which may also be specified in the journal schema as the function to be used to generate the read descriptor) may be applied to convert the normalized tuple(s) into integers (e.g., "−55, 1312"). The output of the transformation function may be included in the read set descriptor 404 in the transaction request 444 in some embodiments. In other embodiments, such transformations of read queries may not be used. In at least some embodiments, the entire text of the read queries corresponding to the read set (e.g., "select salary from EmployeeTable where (name equals 'Alan') or (employeeID equals '123')" in the above example) may also or instead be included in a transaction request 444.

Information about the write target 471 (of data store 430C in the depicted example) to which data is written in the proposed transaction may also be recorded by the transaction submitter 432, e.g., by applying similar transformation functions to queries whose results may be affected by the writes. For example, in one embodiment, a journal schema defined for the journal may indicate one or more query restriction descriptors indicating the sets of data object attributes for which read-write conflicts are going to be detected at the database. A set of queries (Q1, Q2, . . . ) directed to such attributes may be identified by the transaction submitter, such that results of the queries would be affected by the proposed write directed to target 471. The predicates of those queries may then be converted into integers using an algorithm involving normalization followed by transformation in one implementation, in a manner similar to the approach described for the read set descriptor above, and the integers may be included in write set descriptor 406. In embodiments in which both the read set and the write set are represented using sets of integers produced by transformation functions applied to corresponding queries, the task of identifying potential read-write conflicts may be simplified to checking whether any of the integers of a read set description of a proposed transaction are present in the write set descriptors of transactions that have been committed since the operations to read the objects indicated in the read set were performed. Of course, depending on the transformation functions used, the presence of the same integer in a read set and a committed write set may represent a false positive in some embodiments: e.g., the query predicate "attr1:value1" of a read set may have been hashed to the same integer as a different predicate "attr2:value2" of a query affected by a committed write. In at least some embodiments, in addition to or instead of a transformed representation of the write set descriptor, the full text of the proposed write operation directed to target 471 may be included in the transaction request 444.

In some implementations, the transaction submitter may also obtain, from each of the data stores 430, a corresponding latest-applied commit sequence number (LACSN) 431 (e.g., 431A-431C) of the most recent transaction whose writes have been applied at the data store. In one embodiment, such LACSNs 431 may be retrieved before any of the reads of the transaction are issued to the corresponding data stores, for example. In another embodiment, the LACSNs 431 may be retrieved from a given data store 430 just before the first read that is directed to that data store within the current transaction is issued.

The conflict check delimiter 402 may be derived from a function to which the LACSNs 431 are provided as input in some embodiments. For example, in one implementation, the minimum sequence number among the LACSNs obtained from all the data stores read during the transaction may be used as the delimiter. In another implementation, a vector or array comprising the LACSNs from each of the data stores may be included as the conflict check delimiter 402 of the transaction request. The conflict check delimiter 402 may also be referred to herein as a committed state identifier, as it represents a committed state of one or more data stores upon which the requested transaction depends. The conflict check delimiter 402 may be used by the journal manager to identify the subset of committed transaction entries to be used to perform conflict detection with respect to the transaction request 444 in various embodiments.

As discussed above, in some embodiments, transformation functions may be applied to read queries to generate the read set descriptor 404, and/or similar transformation functions may be applied to write-affected queries (a set of queries whose results may be affected by the proposed writes) to generate write set descriptor 406. In some embodiments, instead of the query-based transformation, a selected transformation function may instead be applied to the locations/addresses of the read targets to obtain a set of hash values to be included in read descriptor 404. Similarly, a selected transformation function (either the same function as was used for the read descriptor, or a different function, depending on the implementation) may be applied to the location of the write(s) of a transaction to generate the write set descriptor 404 in some embodiments. In another embodiment in which read set descriptors and/or write set descriptors are generated based on locations rather than query contents, hashing may not be used; instead, for example, an un-hashed location identifier may be used for each of the read and write set entries. The write payload 408 may include a representation of the data that is to be written for each of the writes included in the transaction.

A required transaction descriptor 410 may indicate a signature of a transaction whose commit is a prerequisite for committing the currently-requested transaction. In some embodiments, a given transaction T1 may not be considered committable if another transaction T2 has already been committed. A forbidden transaction descriptor 412 may indicate a signature of such a transaction whose commit would result in an abandonment of the currently-requested transaction. Forbidden transaction descriptors may be used for duplicate detection/elimination in some embodiments, while required transaction descriptors may be used for sequencing specified transactions before or after other transactions in some embodiments. Register processing section 414 may include a collection of requested register operations to be performed by the journal manager; examples of the kinds of register operations which may be supported in various embodiments are provided in FIG. 5. Some or all of the contents of the transaction request 444 may be stored as part of the journal entries (e.g., committed transaction records) in some embodiments. In some embodiments, for example, the full text of the read queries corresponding to the read set, the full text of the write operations corresponding to the write set, and/or the full text of the register processing section may be stored in the committed transaction entries.

It is noted that the read and write targets from which the read set descriptors and/or write set descriptors are generated may represent different storage granularities, or even different types of logical entities, in different embodiments or for different data stores. For example, for a data store comprising a non-relational database in which a particular data object is represented by a combination of container name (e.g., a table name), a user name (indicating the container's owner), and some set of keys (e.g., a hash key and a range key), a read set may be obtained as a function of the tuple (container-ID, user-ID, hash key, range key). For a relational database, a tuple (table-ID, user-ID, row-ID) or (table-ID, user-ID) may be used. In various embodiments, the journal manager may be responsible, using the contents of a transaction request and the journal, for identifying conflicts between the reads indicated in the transaction request and the committed writes indicated in the journal.

Register Operations

Figure 5:
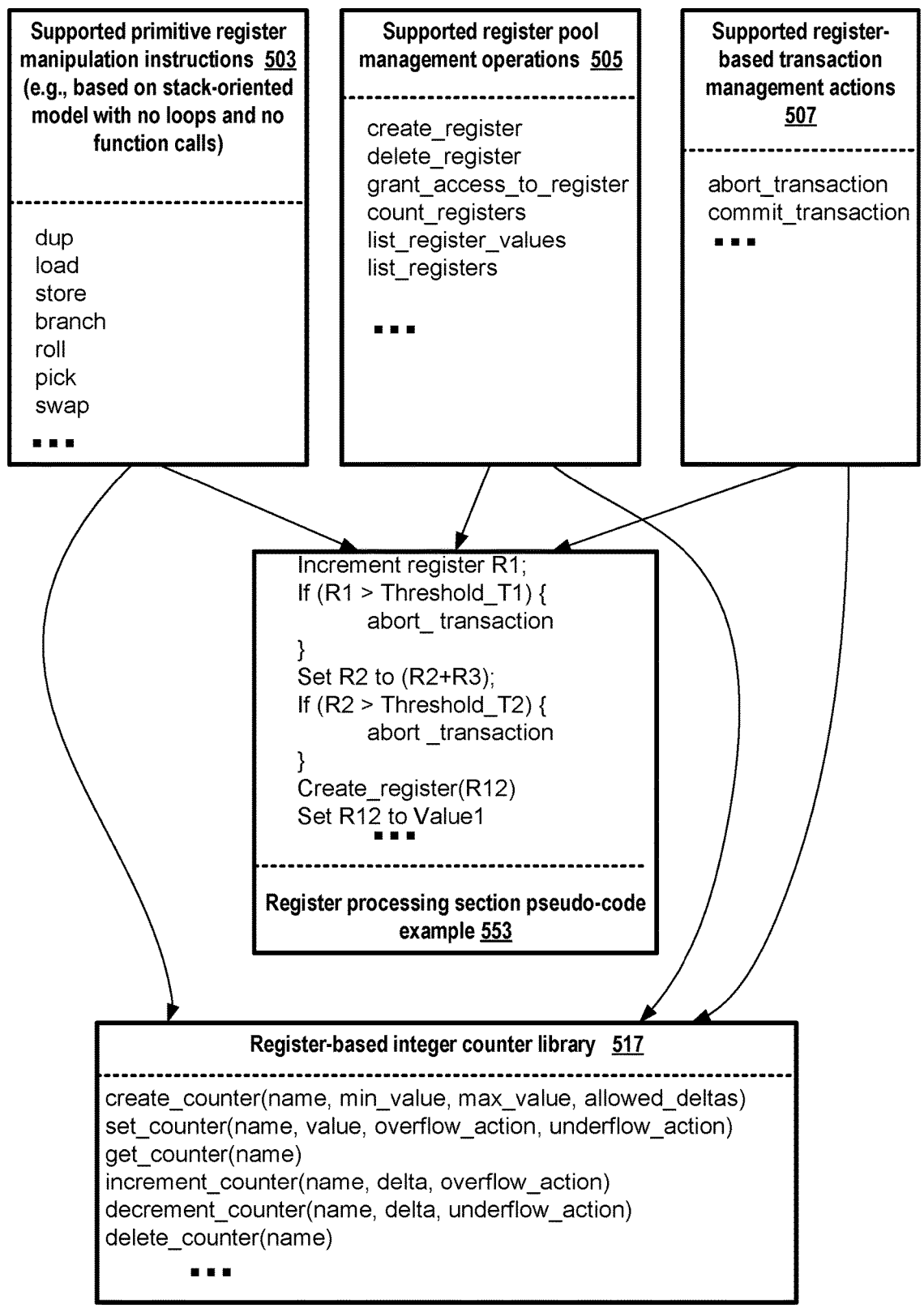
FIG. 5 illustrates examples of register-based operations which may be supported by a journal manager, according to at least some embodiments.

Very high rates of transaction requests may be supported by the journal manager in some embodiments. If each transaction request contains complex register manipulation directives (e.g., in the form of programs written in modern high-level programming languages), register-related processing and storage requirements may become a substantial overhead for the journal manager. If the register processing sections contained loops or method/function calls of arbitrary recursion depths, it may even be possible for a transaction request to result in a crash of a journal manager, or for the journal manager to enter an infinite loop. To avoid these kinds of problems and still support a reasonable set of register-based functions for replicated state management, in some embodiments a restricted register manipulation language or library may be used, in which for example loops and method calls may not be supported in the manner that such constructs are supported in high-level programming languages. Generally speaking, the language restrictions may be imposed in an attempt to avoid scenarios in which unbounded computations can occur. The language restrictions may ensure, for example, that the total amount of register-related computation that can be performed for a given transaction request is at most linearly proportional to the number of register commands issued in the transaction request, and cannot grow exponentially or at other non-linear rates with respect to the size of the register processing section. FIG. 5 illustrates examples of register-based operations which may be supported by a journal manager, according to at least some embodiments.

A set of primitive register manipulation instructions 503 may be used in some embodiments to read, write and perform computations on register contents. A stack-oriented instruction set may be used in the depicted embodiment, which does not directly support looping constructs (such as while loops which could potentially result in infinite looping) and function calls. A transaction submitter may utilize "load" and "store" instructions to write and read (respectively) from the top of the stack in one such implementation, a "dup" instruction to duplicate the contents of the current top-of-stack entry, a "branch" instruction to jump to a specified other instruction, a "swap" instruction to exchange the values of the top-of-stack entry with the next entry, a "pick" instruction to read a particular entry at a specified depth in the stack, a "roll" instruction to move an entry at a specified depth to the top of the stack, and so on.

In addition to the primitive instructions 503, any of a set of register pool management operations 505 and/or transaction management operations 507 may be included in the register processing section of transaction requests in some embodiments. Register pool management operations may include, for example, a create_register operation to add a new register, a delete_register operation to relinquish further access to a specified register, a count_registers operation to indicate the number of registers accessible to the transaction submitter, a list_registers operation to obtain a list of register names, a list_register_values command to obtain values of some or all accessible registers, and the like. In some embodiments, a given client instance or transaction submitter may request that access to a specified register or set of registers be granted to a different client instance or transaction submitter, e.g., using a grant_access_to_register operation. The transaction management operations 507 may include operations to abort the transaction (e.g., based on a result of a register write operation or read operation), or to commit a transaction. Other types of register manipulation primitives, register pool management operations and/or transaction management operations may be supported in different embodiments. In at least one embodiment, the register processing section of a transaction request may be formatted in a specified context-free language corresponding to a particular pushdown automaton.

An example segment of register processing section pseudo-code 553 for which the actual code may be prepared using supported primitives 503 and operations 505 and 507 is shown in FIG. 5. In the pseudo-code, a register R1 is incremented (e.g., by loading contents of R1 to the top of the stack and adding 1), and the requested transaction is aborted (e.g., using a primitive branch instruction) if the result of the increment exceeds a threshold T1. Then, contents of register R2 are set to the sum of contents of registers R2 and R3. If, as a result, R2 exceeds a different threshold, the requested transaction may also be aborted. If neither the increment to R1 nor the addition to R2 results in an abort, a new register R12 is created and set to value1. Using the relatively simple constructs supported for the registers, the core optimistic concurrency control logic implemented by the journal manager (e.g., the read-write conflict detection logic and the logical constraint checking logic) may be extended in a customizable manner in the depicted embodiment. For example, in one content management application, a unique integer item identifier may have to be assigned to each new content entry. As new items are added to the content management application's database, item identifiers may be incremented. If the increment results in an overflow, the transaction to insert the corresponding item may have to be aborted. The logic for enforcing such an abort may be implemented using the register processing section of the item insertion transaction requests in some embodiments.

In at least one embodiment, a higher-level library to manage various commonly-used types of data objects may be constructed from the primitive operations, and a transaction submitter may utilize such a library instead of using the primitives. For example, a library 517 for manipulating integer counters may be implemented using journal-based registers. The library may include functions to create and delete counters, set counters, increment or decrement counters, and so on, and to take various actions (e.g., abort or commit a transaction) based on the results of the counter manipulations. The underlying operations for implementing the library functions may be performed using lower-level instructions such as the stack-based instructions discussed above. Several such libraries for different types of programming constructs (e.g., trees, arrays, etc.) built on top of journal registers may be implemented and made accessible to transaction submitters in various embodiments. As mentioned earlier, in some embodiments the register processing section may be compiled into an executable format (e.g., at a host at which the transaction submitter runs) before it is transmitted as part of a transaction request to the journal manager.

In at least some embodiments, the register processing section of a transaction request may include intrinsic functions or methods. An intrinsic function may be handled by a byte code execution engine of the journal in a different manner than standard byte code, and may be used to model components and behaviors which cannot be handled easily in the standard byte code. For example, in one embodiment, journal registers may be defined as 64-bit integers, but a transaction submitter may wish to perform string operations (or operations on other non-integer data types) using the journal registers. In one such scenario, intrinsic string manipulation functions may be permitted in the register processing section. The execution engine of the journal may translate the intrinsic functions into the appropriate set of lower-level instructions (e.g., instructions in a native instruction set of the host at which the execution engine runs) in some implementations. Results of such intrinsic functions may also be used for commit/abort decisions in some embodiments, just as the results of other register commands may be used for commit/abort decisions. Libraries of intrinsic functions for supporting various types of constructs using registers may be available to transaction submitters in some embodiments. Restrictions similar to those discussed above regarding unbounded or exponential computations may also be imposed on the intrinsic operations in various embodiments.

Read-Write Conflict Detection

Figure 6:
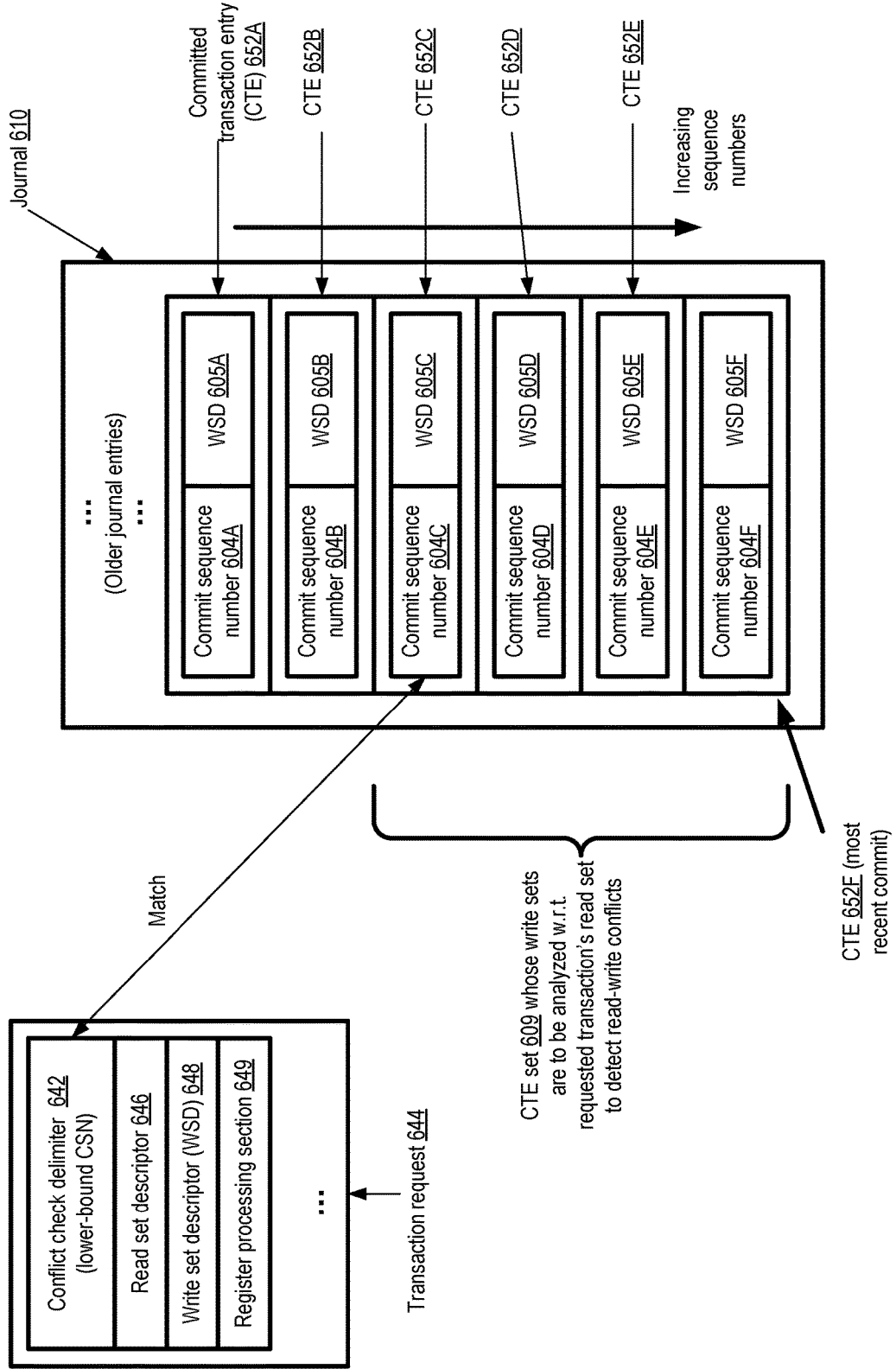
FIG. 6 illustrates an overview of read-write conflict detection operations which may be performed by a journal manager, according to at least some embodiments.

In at least some embodiments the commit decision for a given transaction may be based on results of several different operations of the journal manager, including for example read-write conflict detection, logical constraint checks, and register manipulations. FIG. 6 illustrates an overview of read-write conflict detection operations which may be performed by a journal manager, according to at least some embodiments. In the depicted example, committed transaction entries (CTEs) 652 stored at journal 610 are shown arranged in order of increasing commit sequence numbers from the top to the bottom of the figure. The latest or most recently committed transaction is represented by CTE 652F, with commit sequence number (CSN) 604F and write set descriptor (WSD) 605F. Each of CTEs 652A, 652B, 652C, 652D and 652E comprises a corresponding CSN 1004 (e.g., 652D and 652E comprises a corresponding CSN 1004 (e.g., CSNs 604A-604E respectively) and a corresponding WSD 705 (e.g., WSDs 605A-605E).

As shown, transaction request 644 includes a conflict check delimiter (or committed state identifier) 642, a read set descriptor 646, a write set descriptor 648 and register processing section 649. (The write payload and various other elements of the requested transaction such as the elements discussed in the context of FIG. 4 are not shown in FIG. 6). The conflict detector of the journal manager may be required to identify a set of CTEs of journal 610 that are to be checked for conflicts with the read set of the requested transaction. The conflict check delimiter 642 indicates a lower-bound CSN that may be used by the conflict detector to identify the starting CTE of set 609 to be examined for read-write conflicts with the requested transaction in the depicted embodiment, as indicated by the arrow labeled "Match". Set 609 may include all the CTEs starting with the matching sequence number up to the most recent committed transaction (CTE 652F) in some embodiments. If any of the writes indicated by the CTE set 609 overlap with any of the reads indicated in the transaction request 644, such a read-write conflict may lead to a rejection of the requested transaction. A variety of algorithms may be used to check whether such an overlap exists in different embodiments. In one embodiment, for example, one or more hashing-based computations or probes may be used to determine whether a read represented in the read set descriptor 646 conflicts with a write indicated in the CTE set 609, thereby avoiding a sequential scan of the CTE set. In some implementations, a sequential scan of CTE set 609 may be used, e.g., if the number of records in the CTE set is below a threshold. If none of the writes indicated in CTE set 609 overlap with any of the reads of the requested transaction, the transaction may be considered free of read-write conflicts, since none of the data that were read during the preparation of the transaction request can have changed since they were read. In at least one embodiment, a transaction request may also indicate an upper bound on the sequence numbers of journal entries to be checked for conflicts—e.g., the conflict check delimiter may indicate both a starting point and an ending point within the set of CTEs 652.

In embodiments in which hash functions or other similar transformation functions are used to represent queries corresponding to reads (in the read set descriptors) and queries which would be affected by writes (in the WSDs), it may sometimes be the case that a detected conflict is a false positive, e.g., due to hash collisions. For example, if a the read set descriptor includes the integer "10" as the representation of a read query RQ, and one of the WSDs of the CTE set 609 happens to include the integer "10" as the representation of an unrelated query WAQ (write-affected query) whose result would be affected by a committed write, the transaction request 644 may be rejected despite the fact that the two queries RQ and WAQ did not truly represent a read-write conflict. By choosing transformation functions with appropriate statistical properties, the probability of such collisions and false positives may be reduced in various embodiments.

Logical Constraint Violation Detection

Figure 7:
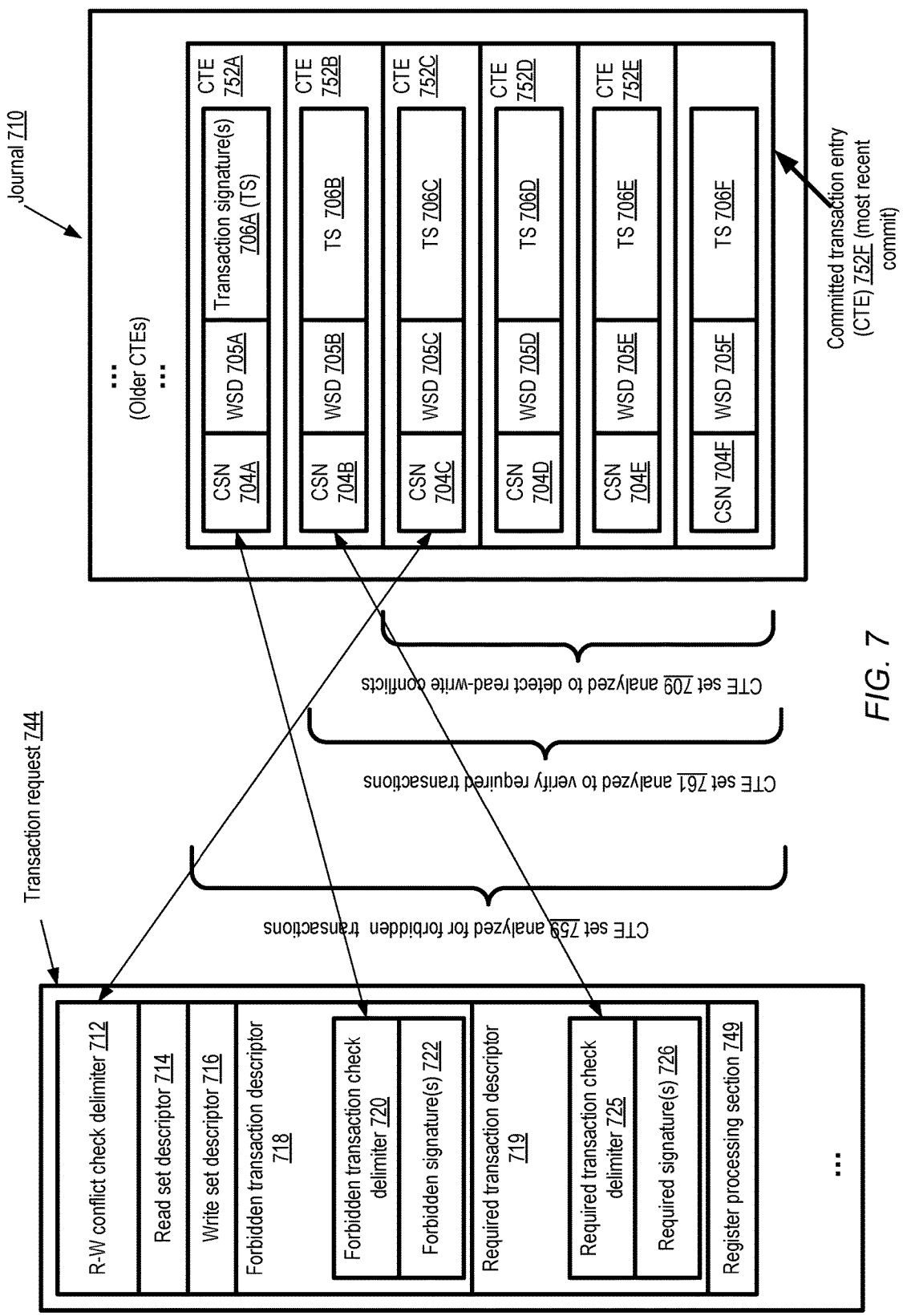
FIG. 7 illustrates an overview of commit processing for a transaction request which may include logical constraints, according to at least some embodiments.

FIG. 7 illustrates an overview of commit processing for a transaction request which may include logical constraints, according to at least some embodiments. A number of different kinds of logical constraint-related operations may be evaluated to make commit decisions in some embodiments, including for example checking for forbidden transactions and/or for required transactions. In one embodiment, storage service clients may wish to ensure that duplicate entries are not written to one or more data stores; that is, duplicate transactions may be forbidden. The semantics of some applications may require that if a given transaction T1 is committed, a different transaction T2 may not be committed (and vice versa—e.g., if T2 has been committed, T1 cannot be committed); such mutual exclusion may also be implemented using forbidden transaction constraints. Similarly, in some embodiments, an application's semantics may require that for a given transaction T1 to be committed, a different transaction T2 must have been committed earlier. In such scenarios, logical constraints may be expressed in the form of prerequisite or required transactions.

As shown, the transaction request 744 comprises a read-write conflict check delimiter 712, a read-set descriptor 714, a write-set descriptor 716, a register processing section 749 and two logical constraint delimiters: a forbidden transaction descriptor 718 and a required transaction descriptor 719. Forbidden transaction descriptors such as 718 may also be referred to as transaction exclusion descriptors. The write payload of the transaction request is not shown in FIG. 7. As shown, forbidden transaction descriptor 718 may include a corresponding forbidden transaction check delimiter 720, and one or more forbidden transaction signature(s) 722 in the depicted embodiment. Required transaction descriptor 719 may include a corresponding required transaction check delimiter 725, and one or more required transaction signature(s) 726 in the depicted embodiment.

In order to determine whether to accept the requested transaction, journal manager may have to perform at least three types of checks in the depicted embodiment (e.g., independently of the register processing section's operations, which may also affect commit/abort decisions as discussed above): one for detecting read-write conflicts, one for verifying that forbidden transactions have not been committed, and one for verifying that required transactions have been committed. The committed transaction entries 752 in the journal 710 may each include respective commit sequence numbers (CSNs 704), write set descriptors (WSDs) 705, and transaction signatures (TSs) 706 in the depicted embodiment. To determine whether a read-write conflict has occurred, the journal may identify CTE set 709, starting at a sequence number corresponding to read-write conflict check delimiter 712 and ending with the most-recent CTE 752F, whose write sets are to be evaluated for overlaps with the requested transaction's read set descriptor 714. If a read-write conflict is detected (i.e., if such an overlap exists), the requested transaction may be rejected.

To determine whether any forbidden transaction with respect to the requested transaction has been committed, another CTE set 759 may be identified in the depicted embodiment starting at a sequence number corresponding to forbidden transaction check delimiter 720, and ending at the most recent CTE 752F. For each of the CTEs in set 759, the journal manager may check whether any of the transaction signatures stored in the CTE match the forbidden signature(s) 722 of the requested transaction. The requested transaction may be rejected if a forbidden transaction is found among the CTEs, even if no read-write conflicts were detected. Similarly, to verify that required transactions with respect to the requested transaction have been committed, a third CTE set 761 may be identified in the depicted embodiment starting at a sequence number corresponding to required transaction check delimiter 725, and ending at the most recent CTE 752F. For each of the CTEs in set 761, the journal manager may check whether any of the transaction signatures stored in the CTE match the required signature(s) 726 of the requested transaction. The requested transaction may be rejected if at least one of the required transactions is not among the CTE set 761, even if no read-write conflicts were detected and no forbidden transactions were detected.

In at least some embodiments, a transaction signature 706 may be generated from one or more of the other elements of a transaction request, e.g., by applying a hash function to the other elements. In some embodiments in which write set descriptors are also prepared using hash functions, a different hash function may be used for write set descriptors than is used for transaction signatures. For example, for some applications, clients may be much more concerned about detecting duplicates accurately than they are about occasionally having to resubmit transactions as a result of a false-positive read-write conflict detection. For such applications, the acceptable rate of errors in read-write conflict detection may therefore be higher than the acceptable rate of duplicate-detection errors. Accordingly, in some implementations, cryptographic-strength hash functions whose output values take 128 or 256 bits may be used for forbidden signatures, while simpler hash functions whose output is stored using 16 or 32 bits may be used for the write signatures included in the write set descriptors. In some scenarios, forbidden transaction checking or de-duplication may be required for a small subset of the data stores being used, while read-write conflicts may have to be checked for a much larger set of transactions. In such cases, storage and networking resource usage may be reduced by using smaller write set signatures than transaction signatures in some embodiments. In other embodiments, write set descriptors may be used for both read-write conflict detection and forbidden/required transaction constraints. Similarly, in some embodiments, the same sequence number value may be used as a read-write conflict check delimiter, a forbidden transaction check delimiter, and/or a required transaction check delimiter (e.g., separate delimiters may not be required with respect to read-write conflicts, forbidden transactions or required transactions). In at least one embodiment, checking for duplicate may be performed by default, e.g., using the write-set descriptors, without the need for inclusion of a separate forbidden transaction descriptor in the transaction request.

For some applications, clients may be interested in enforcing a commit order among specified sets of transactions—e.g., a client that submits three different transaction requests for transactions T1, T2 and T3 respectively may wish to have T1 committed before T2, and T3 to be committed only after T1 and T2 have both been committed. Such commit sequencing constraints may be enforced using required transaction descriptors in some embodiments. In some embodiments, more complex sequencing constraints may be enforced. For example, instead of simply requesting the journal manager to verify that two transactions T1 and T2 must have been committed (in any order) prior to the requested transaction's commit, a client may be able to request that T1 must have been committed prior to T2. Similarly, in some embodiments a client may be able to request negative ordering requirements: e.g., that some set of transactions {T1, T2, Tk} should have been committed before the requested transaction in some specified order (or in any order), and also that some other set of transactions {Tp, Ts} should not have been committed. Such constraints may be implemented using more sophisticated versions of the required and forbidden transaction descriptors of FIG. 7 in some embodiments.

If no read-write conflict is detected, no forbidden transactions are found in the journal, and all required transactions have been committed, the register processing section may be executed in the depicted embodiment. Some register operations may potentially result in abandoning/aborting the transaction as discussed earlier. If the operations in the register processing section are completed without requiring abandonment of the requested transaction, the requested transaction may be accepted for commit by the journal manager and a new committed transaction entry for it may be appended to the journal. It is noted that in various embodiments, logical constraints need not be specified in a transaction request, or only one kind of logical constraint (a required transaction constraint or a forbidden transaction constraint) may be included in a given transaction request.

Register Values Materialized at Member Data Stores

Figure 8:
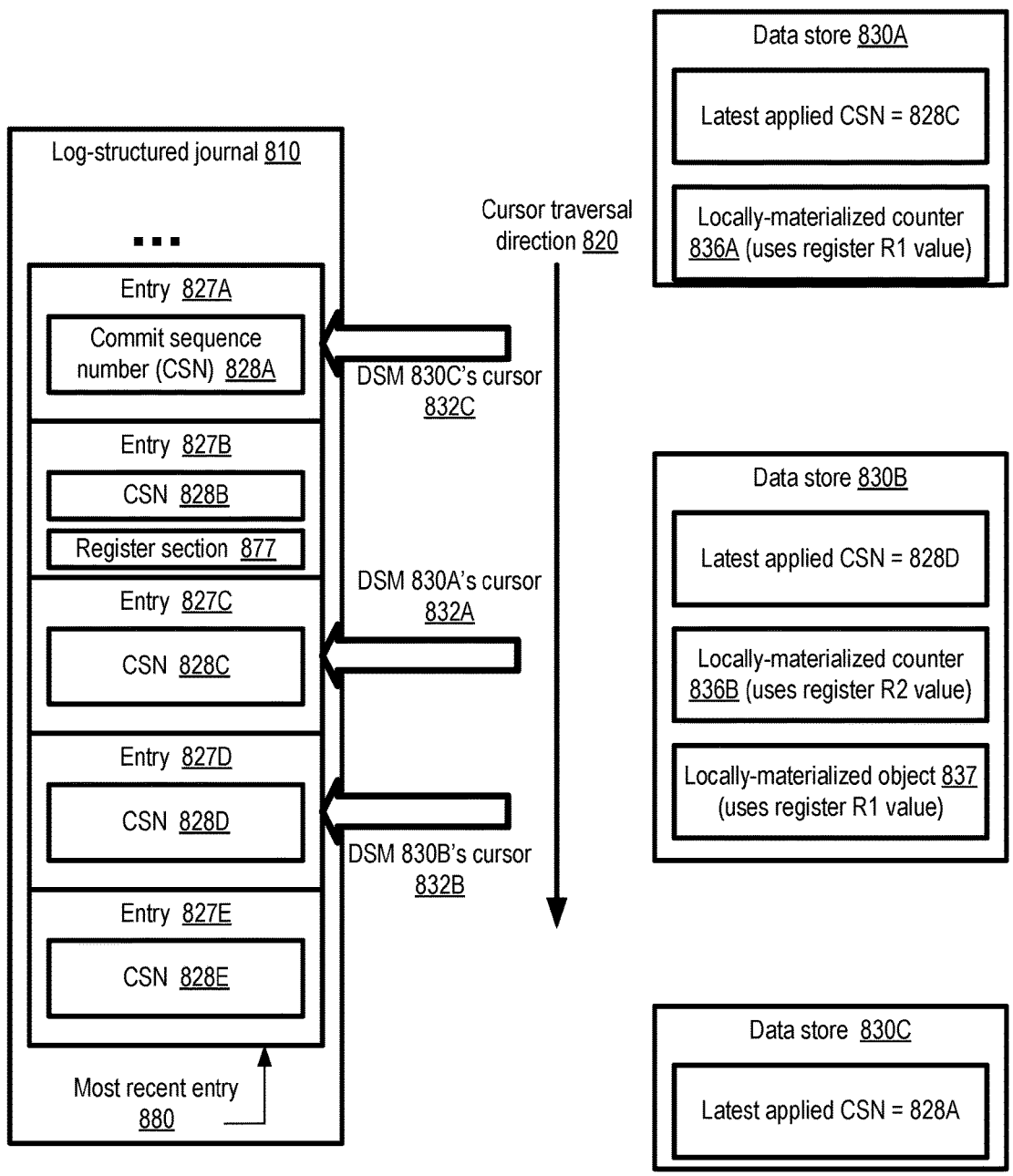
FIG. 8 illustrates an example of asynchronous processing of journal entries to materialize writes at various data stores, according to at least some embodiments.

In some embodiments, register values may be materialized not only at one or more journal nodes (e.g., the acceptor node shown in FIG. 2), but also at the member data stores of the state management system, e.g., as part of the propagation of committed writes to the data stores. FIG. 8 illustrates an example of asynchronous processing of journal entries to materialize writes at various data stores, according to at least some embodiments. At a point of time corresponding to FIG. 8, the journal 810 comprises a plurality of entries 827 inserted in order of respective commit sequence numbers (CSNs) 828, with the most recent entry 840 being entry 827E with CSN 828E. The most recent entry may sometimes be referred to as the "head" of the journal.

At least some of the journal entries may include values of (or changes to) one or more journal registers as of the time that the corresponding transaction request was accepted for commit (including any register writes that were part of the committed transaction)—e.g., entry 828B includes register section 877. In some embodiments each journal entry may indicate values of one or more registers. In one embodiment, a given journal entry may comprise only the values of those registers which were modified in the corresponding transaction, while in other embodiments values of all the registers which were accessible to the transaction submitter may be included. In some embodiments, instead of the materialized values of the registers, a representation of the changes applied to the registers may be stored in journal entries 828.

In the depicted scenario, the journal-based storage system has at least three data stores 830A-830C. Two of the three member data stores materialize the values of one or more registers in local data objects. Data store 830A stores a locally-materialized version of a counter 836A, into which the values of a register R1 are stored as a result of a propagation of one or more writes from the journal. At data store 830B, register R1 values are used to update a data object 837, while register R2 values are used for a local version of a counter 836B. Register values are not materialized at data store 830C.

Each of the data stores may maintain a cursor onto the sequence of commit entries of the journal, and process the entries in the order in which the entries were inserted into the journal in the depicted embodiment. For example, cursor 832A is established for data store 830A, cursor 832B is maintained for data store 830B, and cursor 832C is maintained for data store 830C in the depicted scenario. As indicated by arrow 820, each of the cursors processes the entries of journal 810 in the same order, e.g., in increasing order of CSNs 828 of the entries. At the point of time illustrated in FIG. 8, entries with CSNs up to 828C have been processed at data store 830A, entries corresponding to CSNs up to 828D have been processed at data store 830B, and entries corresponding to CSNs up to 828A have been processed at data store 830C. Each data store manager may keep track of the latest applied commit sequence number at the corresponding data store, which represents the state of the database as materialized at the data store. Each of the data store cursors or write appliers may process journal entries independently of the others in the depicted embodiment, and may not necessarily be aware of the existence of other journal consumers. When a register value (or register state change) is indicated in a given committed transaction entry, the corresponding data objects (if any) at the data store may be modified accordingly. In some embodiments, as mentioned above, some or all of the committed transaction entries of the journal may contain the values of the journal registers as of the time of the corresponding commit (or the changes if any that were applied to the journal registers in the corresponding transaction requests), and these journal entries may be used to update the register-dependent data objects (such as counters 836A and 836B and object 837) at the data stores.

Methods for State Management Using Journal-Based Registers

Figure 9:
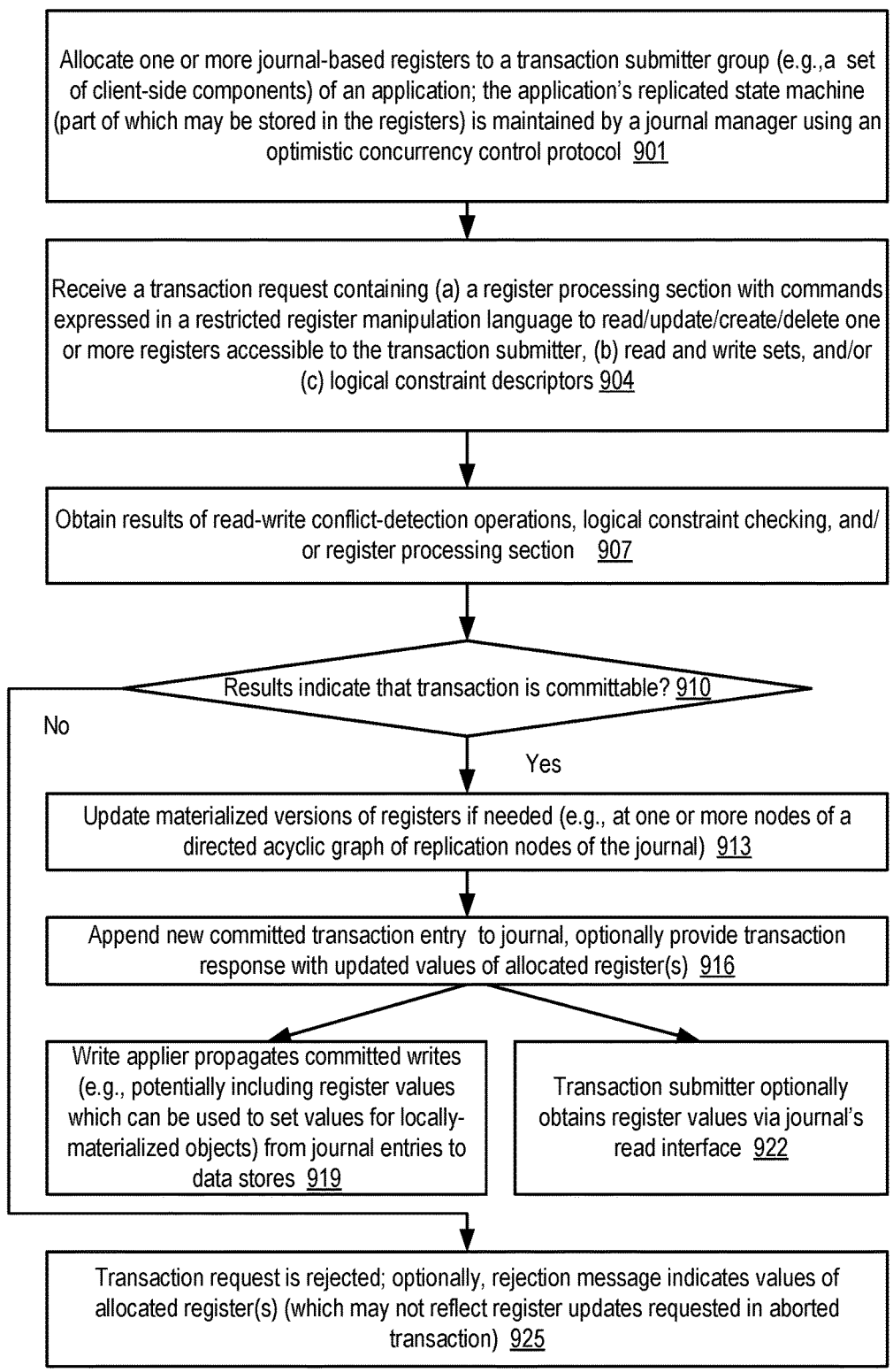
FIG. 9 is a flow diagram illustrating aspects of operations that may be performed at a journal-based replicated state management system which supports register processing, according to at least some embodiments.

FIG. 9 is a flow diagram illustrating aspects of operations that may be performed at a journal-based replicated state management system which supports register processing, according to at least some embodiments. As shown in element 901, a set of one or more journal registers may be allocated to a group of transaction submitters associated with an application. The application's replicated state machine may be maintained using an optimistic concurrency control protocol by a journal manager: for example, respective committed transaction entries representing state changes of the application may be stored sequentially in a journal. Part of the application's state may be stored using the journal registers in various embodiments. In some embodiments, a given journal manager may establish a pool of registers from which some number of individual registers may be allocated to transaction submitters, e.g., on demand or at the time that the corresponding application is initialized.

A transaction request may be received at the journal manager (element 904). The transaction request may include a register processing section indicating various operations directed to the journal registers allocated to the transaction submitter. The register operations may be expressed in a restricted or limited register language which does not support loops or function/method calls in some embodiments. Such restrictions may be imposed, for example, to try to ensure that the journal manager does not get overwhelmed by (or hang/crash as a result of) register processing operations themselves. In one embodiment a context free language corresponding to a selected pushdown automaton model may be used for register operations. In addition to the register processing section, the transaction request may include various other elements, including for example a read set descriptor indicating objects read during transaction preparation, a write set descriptor indicating objects to which writes are to be applied if the transaction is committed, the write payloads corresponding to the writes, and/or one or more logical constraint descriptors. A logical constraint descriptor may, for example, indicate a signature of a required transaction (e.g., a value obtained by applying a hash function to one or more elements of the corresponding transaction request) whose commit is a prerequisite for the commit of the currently-requested transaction. A signature of a forbidden transaction (a transaction which, if it has been committed prior to the commit analysis of the currently proposed transaction, would result in the abandonment or abort of the currently proposed transaction) may be included in some logical constraint descriptors.

Depending on the kinds of commit-decision-related elements included in the transaction request, the journal manager may perform read-write conflict detection (e.g., if the transaction request comprises a non-null read set) and or check for logical constraint violations (element 907) in addition to performing the operations proposed in the register processing section. For example, with respect to read-write conflicts, a subset of previously added committed transaction entries may be identified from the journal, and the read set of the proposed transaction may be checked for conflicts with the write sets of the previously-committed transaction entries in one embodiment. With respect to logical constraints, subsets of the committed transaction entries (which may include respective transaction signatures) may be examined to determine whether a forbidden transaction was committed earlier, and/or to verify that a required transaction was in fact committed. The register processing section itself may include some operations whose results may be used to make an abort decision or a commit decision—e.g., a given register operation may increment a counter value, and the transaction may have to be aborted if the incremented counter value exceeds a threshold, causes an integer overflow, etc. Results of the read-write conflict detection operation, logical constraint checking operations, and register processing operations may all have to be taken into consideration in some embodiments before a decision to accept the transaction for commit can be made—e.g., any of these operations may result in an abort. In some embodiments the operations may be performed in a particular sequence—e.g., the read-write conflict detection may be performed first, followed (if no read-write conflict is detected) by the logical constraint checking, followed (if no logical constraints are violated) by the register processing. In other embodiments, a different ordering may be used, or at least some of the operations may be performed in parallel with others. In some embodiments, read-write conflict detection may not be performed for at least some transactions, and/or logical constraint checking may not be performed—e.g., a transaction's commit decision may be based on register operations alone.

If the results of the conflict detection, logical constraint checking, and/or register processing operations indicate that the transaction is acceptable for commit (element 910), materialized versions of the registers may be updated if needed (element 913), e.g., at one or more nodes of a directed acyclic graph of nodes of the journal. Such updates may not be required if the register processing section did not include any writes. A new committed transaction entry representing the approved-for-commit transaction (element 916) may be added to the journal, and may also be replicated along the replication pathway of the directed acyclic graph in some embodiments. In some embodiments, a response indicating the commit (and in some cases including the most recently-updated values of one or more journal registers including the registers on which operations were performed in the register processing section) may be sent to the transaction submitter. The new committed transaction entry may include various elements of the transaction request in different embodiments, such as for example the write set descriptor, the read set descriptor, a transaction signature which can be used for subsequent logical constraint checking, and/or the register processing section. In one embodiment, at least some committed transaction entries may include values of one or more registers (e.g., as opposed to the register processing sections themselves).

In some embodiments, respective write appliers associated with one or more member data stores of the state management system may propagate committed writes (e.g., including register writes) to the member data stores from the journal (element 919). Transaction submitters may retrieve register values using programmatic interfaces provided by the journal manager in some embodiments (element 922).

If a read-write conflict or a logical constraint violation was detected, and/or if the register processing section's operations direct the journal manager to abort the transaction (as detected in element 910), the transaction request may be rejected (element 925). In some embodiments, a rejection message may be sent to the transaction submitter. The rejection message may include the current values of one or more registers in some embodiments (not including any writes proposed as part of the register processing section, since those writes would only be applied if the transaction had been committed).

It is noted that in various embodiments, some of the operations shown in the flow diagram of FIG. 9 may be implemented in a different order than that shown in the figure, or may be performed in parallel rather than sequentially. Additionally, some of the operations shown in the flow diagram may not be required in one or more implementations.

Use Cases

The techniques described above, of enhancing the commit processing capabilities of a state management system using journal-based registers, may be useful in a variety of environments. In many large enterprises at which a journal-based state management technique may be employed, commit decision-making logic that takes read-write conflicts, required transactions and/or prohibited transactions into account may not suffice for some sophisticated applications. Providing registers whose contents can be manipulated in transaction requests, and used in conjunction with the other commit processing decision factors, may allow application designers to implement more flexible commit decision logic. In addition, by materializing registers at the journal manager itself, so that for example the updated contents of a register-based counter become available to client-side components as soon as the corresponding transaction is committed, delays and multiple-round trip messages may be avoided with respect to viewing updated application state information. The use of restricted languages (e.g., based on pushdown automata) for register manipulation may help avoid overloading the journal manager with register-specific operations.

Illustrative Computer System

Figure 10:
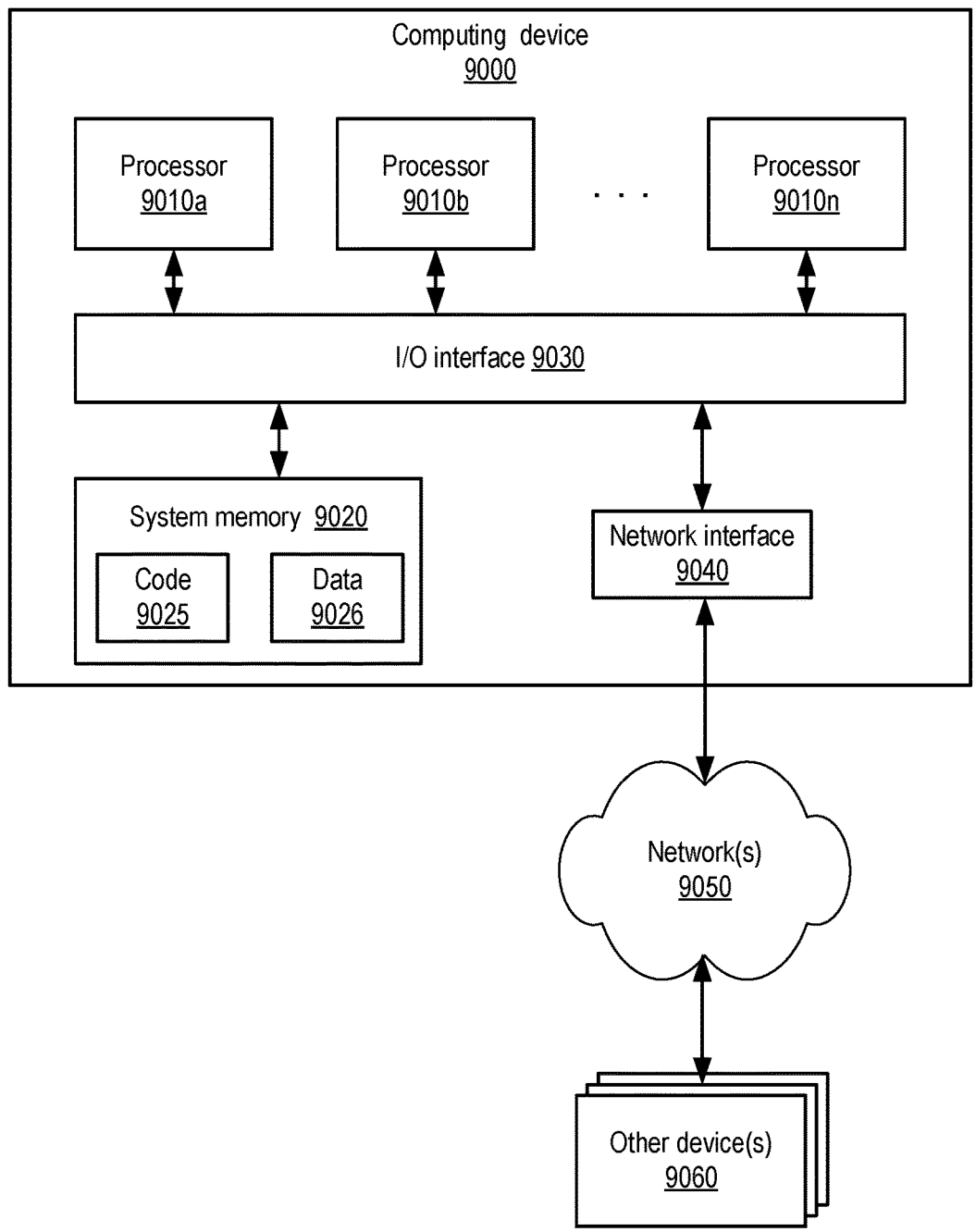
FIG. 10 is a block diagram illustrating an example computing device that may be used in at least some embodiments.

In at least some embodiments, a server that implements one or more of the techniques described above for journal-based state management (including for example the operations of various kinds of journal manager nodes, data store managers, client-side components such as transaction submitters, write appliers, and the like) may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A journal-based state management system comprising a plurality of nodes, wherein individual ones of the plurality of nodes are implemented at one or more computing devices;
    wherein the plurality of nodes are configured to:
        allocate a plurality of journal registers to a group of one or more transaction submitters, wherein a first journal register of the plurality of journal registers comprises a data object represented in a replicated state machine of an application associated with the group, and wherein the first journal register is materialized at one or more nodes of the plurality of nodes;
        receive a transaction request from a particular transaction submitter of the group, wherein the transaction request indicates (a) a read set of a proposed transaction, (b) a write set of the proposed transaction and (c) a register processing section, wherein the register processing section includes an update operation directed to the first journal register;
        determine, based at least in part on one or more of: (a) a result of a conflict detection operation with respect to the read set and one or more committed transaction entries stored previously at one or more nodes of the plurality of nodes, or (b) a result of the update operation, that the transaction request is accepted for commit;
        store, at one or more nodes of the plurality of nodes, a value assigned to the first journal register by the update operation;
        store, at one or more nodes of the plurality of nodes, a new committed transaction entry corresponding to the first transaction request, wherein the new committed transaction entry includes an indication of the write set; and
        provide, to the particular transaction submitter, the value assigned to the first journal register by the update operation.

2. The journal-based state management system as recited in claim 1, wherein the register processing section is formatted in a register manipulation language, wherein the register manipulation language does not support one or more of: (a) loop instructions or (b) function calls.

3. The journal-based state management system as recited in claim 1, wherein the plurality of nodes are configured to:
    prior to providing the value assigned to the first journal register to the transaction submitter, verify that the new committed transaction entry has been replicated at a selected plurality of replication nodes of a directed acyclic graph of replication nodes.

4. The journal-based state management system as recited in claim 1, wherein the plurality of nodes are configured to:
    receive a second transaction request indicating (a) a second read set of a second proposed transaction and (b) a second register processing section;
    determine, using the second read set and a second set of one or more committed transaction entries stored previously, that the second proposed transaction does not have a read-write conflict with respect to previously-committed transactions; and
    abort the second proposed transaction based at least in part on a result of a particular operation indicated in the second register processing section.

5. The journal-based state management system as recited in claim 1, wherein a particular node of the plurality of nodes comprises an execution engine, wherein the register processing section comprises an executable version of one or more register commands, wherein the executable version is obtained at the particular transaction submitter using a compiler, and wherein the particular node is configured to:
    execute at least a portion of the register processing section using the execution engine to obtain the result of the update command.

6. A method, comprising:
    performing, by one or more nodes of a journal-based state management system, wherein individual ones of the one or more nodes are implemented at one or more computing devices:
        receiving a transaction request from a particular transaction submitter of the journal-based state management system, wherein the transaction request indicates a register processing section, wherein the register processing section includes an operation directed to a first journal register allocated to at least the particular transaction submitter, wherein the first journal register comprises a data object represented in a replicated state machine of an application associated with the particular transaction submitter;
        determining, based at least in part on one or more of: (a) a result of a conflict detection operation performed with respect to the transaction request, or (b) a result of the operation directed to the first journal register, that the transaction request is accepted for commit;

storing, at a particular node of the one or more nodes, a value of the first journal register obtained after the operation directed to the first journal register has been completed; and providing, to the particular transaction submitter, the value of the first journal register.

7. The method as recited in claim 6, wherein the register processing section is formatted in a register manipulation language defined by the journal-based state management system, wherein the register manipulation language does not support one or more of: (a) loop instructions or (b) function calls.

8. The method as recited in claim 6, wherein the register processing section is formatted in a context-free language corresponding to a particular pushdown automaton.

9. The method as recited in claim 6, wherein the operation directed to the first journal register is represented using byte code in the register processing section, wherein the register processing section includes an intrinsic function, further comprising:

obtaining, at a particular computing device of the one or more computing devices, a result of the intrinsic function using one or more instructions of a native instruction set, wherein said determining that the transaction request is accepted for commit is based at least in part on the result of the intrinsic function.

10. The method as recited in claim 6, wherein the transaction request includes a read set, and wherein the conflict detection operation comprises determining whether a write set of a committed transaction for which a committed transaction entry has been stored at the journal-based state management system conflicts with the read set.

11. The method as recited in claim 6, wherein the transaction request includes a particular required transaction signature, and wherein said determining that the transaction request is accepted for commit is based at least in part on verifying that a committed transaction entry with the particular required transaction signature has been stored at the journal-based state management system.

12. The method as recited in claim 6, wherein the transaction request includes a particular forbidden transaction signature, and wherein said determining that the that the transaction request is accepted for commit is based at least in part on verifying that a committed transaction entry with the particular forbidden transaction signature has not been stored at the journal-based state management system.

13. The method as recited in claim 6, further comprising performing, by the one or more nodes:

assigning, to a group of one or more transaction submitters including the particular transaction submitter, a particular logical partition of a replicated journal to store committed transaction entries of the group, wherein the particular logical partition has an associated register namespace which includes an identifier of the first journal register.

14. The method as recited in claim 6, wherein said providing the value of the first journal register comprises including the value in a response to the transaction request.

15. The method as recited in claim 6, wherein said providing the value of the first journal register comprises responding to a read request submitted to the one or more nodes via a programmatic interface by the particular transaction submitter.

16. The method as recited in claim 6, further comprising performing, by the one or more nodes:

allocating another journal register to the particular transaction submitter in response to a register allocation request.

17. A non-transitory computer-accessible storage medium storing program instructions that when executed on one or more processors:

receive a transaction request from a particular transaction submitter of a state management system, wherein the transaction request indicates a register processing section, wherein the register processing section includes an operation directed to a first journal register allocated to at least the particular transaction submitter, wherein the first journal register comprises a data object represented in a replicated state machine of an application associated with the particular transaction submitter;

determine, based at least in part on one or more of: (a) a result of a conflict detection operation performed with respect to the transaction request, or (b) a result of the operation directed to a first journal register, that the transaction request is accepted for commit;

store, at a persistent storage device, a value of the first journal register; and provide, to the particular transaction submitter, the value of the first journal register.

18. The non-transitory computer-accessible storage medium as recited in claim 17, wherein the register processing section is formatted in a register manipulation language which does not support one or more of: (a) loop instructions or (b) function calls.

19. The non-transitory computer-accessible storage medium as recited in claim 17, wherein the register processing section is formatted in accordance with a library of integer counter functions.

20. The non-transitory computer-accessible storage medium as recited in claim 17, wherein the instructions when executed at the one or more processors:

receive a second transaction request from a second transaction submitter of the state management system, wherein the second transaction request indicates a second register processing section, wherein the second register processing section includes a second operation directed to the first journal register; and perform the second operation on the first journal register.

21. The non-transitory computer-accessible storage medium as recited in claim 17, wherein the transaction request includes a read set, and wherein the conflict detection operation comprises determining whether a write set of a previously-committed transaction conflicts with the read set.

* * * * *